United States Patent
Onno et al.

(10) Patent No.: US 12,010,319 B2
(45) Date of Patent: Jun. 11, 2024

(54) SAMPLE SETS AND NEW DOWN-SAMPLING SCHEMES FOR LINEAR COMPONENT SAMPLE PREDICTION

(71) Applicant: CANON KABUSHIKI KAISHA, Tokyo (JP)

(72) Inventors: Patrice Onno, Rennes (FR); Christophe Gisquet, Acigne (FR); Guillaume Laroche, Saint Aubin d'Aubigné (FR); Jonathan Taquet, Talensac (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/319,237

(22) Filed: May 17, 2023

(65) Prior Publication Data

US 2023/0370602 A1    Nov. 16, 2023

Related U.S. Application Data

(63) Continuation of application No. 17/519,394, filed on Nov. 4, 2021, now Pat. No. 11,695,933, which is a
(Continued)

(30) Foreign Application Priority Data

Feb. 23, 2018 (GB) .................................. 1802972
Dec. 7, 2018 (GB) .................................. 1820023

(51) Int. Cl.
*H04N 19/00* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11); *H04N 19/189* (2014.11)

(58) Field of Classification Search
CPC .. H04N 19/189; H04N 19/105; H04N 19/156; H04N 19/132; H04N 19/186; H04N 19/42; H04N 19/50; H04N 19/176
See application file for complete search history.

(56) References Cited

U.S. PATENT DOCUMENTS

2014/0140401 A1    5/2014  Lee
2016/0134869 A1*   5/2016  Ikai .......................... H04N 19/42
                                                                      382/166
(Continued)

FOREIGN PATENT DOCUMENTS

CN        105264889 A      1/2016
CN        107211124 A      9/2017
(Continued)

OTHER PUBLICATIONS

Chen et al. "Algorithm Description of Joint Exploration Test Model 7 (JEM 7)". Jul. 2017. (Year: 2017).*
(Continued)

*Primary Examiner* — Zhihan Zhou
(74) *Attorney, Agent, or Firm* — Canon U.S.A., Inc. IP Division

(57) ABSTRACT

The disclosure regards cross-component prediction and methods for deriving of a linear model for obtaining a first-component sample for a first-component block from an associated reconstructed second-component sample of a second-component block in the same frame, the method comprising determining the parameters of a linear equation representing a straight line passing through two points, each point being defined by two variables, the first variable corresponding to a second-component sample value, the second variable corresponding to a first-component sample value, based on reconstructed samples of both the first-component and the second-component; and deriving the
(Continued)

linear model defined by the straight line parameters; wherein said determining the parameters uses integer arithmetic.

8 Claims, 10 Drawing Sheets

Related U.S. Application Data continuation of application No. 16/971,669, filed as application No. PCT/EP2019/054377 on Feb. 21, 2019, now Pat. No. 11,196,998.

(51) Int. Cl.
*H04N 19/132* (2014.01)
*H04N 19/176* (2014.01)
*H04N 19/186* (2014.01)
*H04N 19/189* (2014.01)

(56) References Cited

U.S. PATENT DOCUMENTS

2017/0295365 A1   10/2017   Budagavi et al.
2017/0359595 A1*  12/2017   Zhang ................. H04N 19/186
2018/0048889 A1    2/2018   Zhang

FOREIGN PATENT DOCUMENTS

| GB | 2567249 A | 4/2019 |
| KR | 10-102356234 B1 | 2/2022 |
| TW | 201637449 A | 10/2016 |
| TW | 201804805 A | 2/2018 |
| WO | 2017/042079 A1 | 3/2017 |
| WO | 2020/081187 A1 | 4/2020 |

OTHER PUBLICATIONS

Chen et al. "Chroma intra prediction by reconstructed luma samples". Oct. 2010. (Year: 2010).*

* cited by examiner

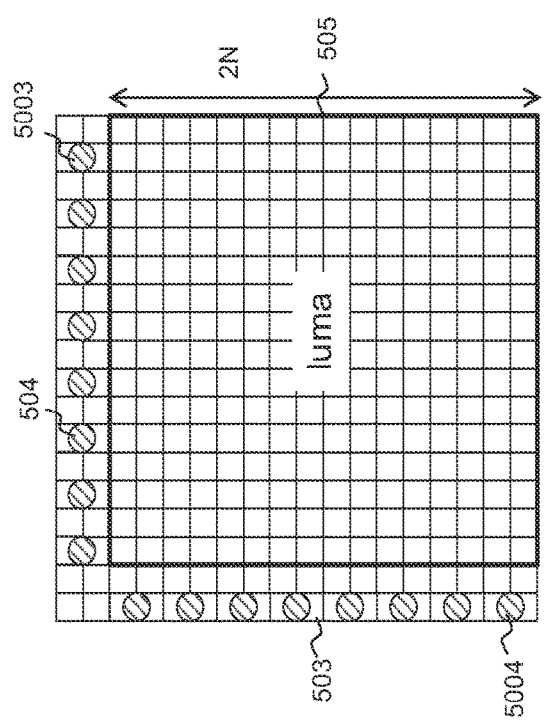
Fig. 5A
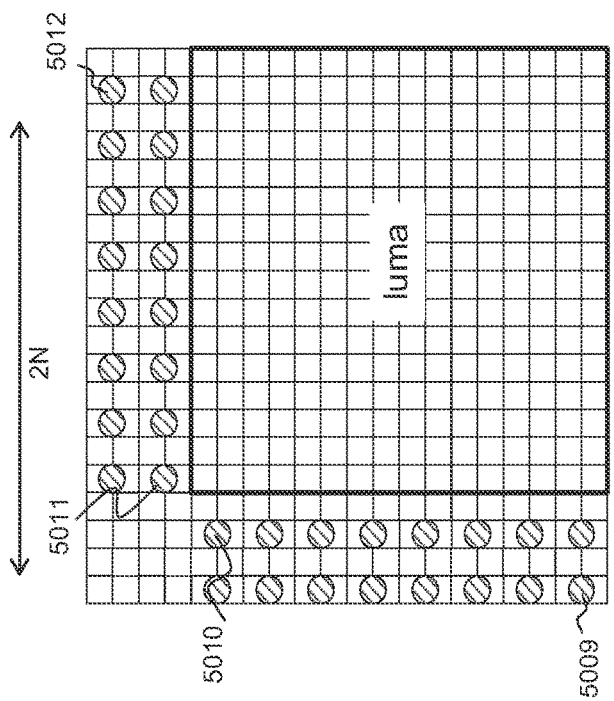
Fig. 5B
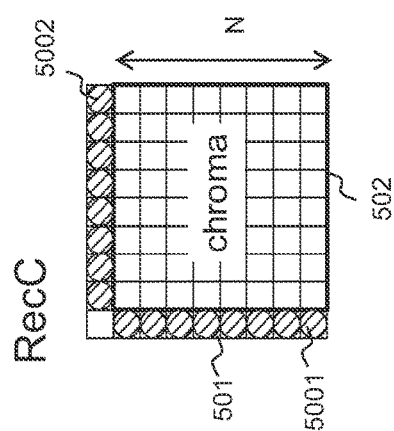
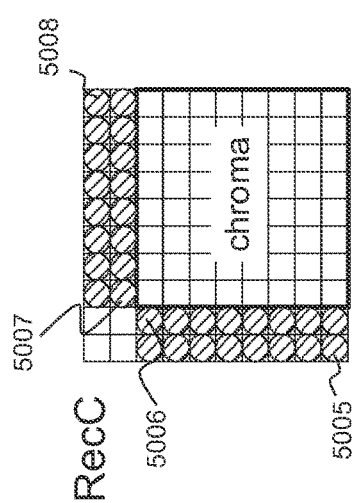

SAMPLE SETS AND NEW DOWN-SAMPLING SCHEMES FOR LINEAR COMPONENT SAMPLE PREDICTION

CROSS REFERENCE TO RELATED APPLICATION

This application is a continuation, and claims the benefit, of U.S. patent application Ser. No. 17/519,394, presently pending and filed on Nov. 4, 2021, which is a continuation, and claims the benefit, of U.S. patent application Ser. No. 16/971,669, filed on Aug. 20, 2020, issued as U.S. Pat. No. 11,196,998 on Dec. 7, 2021, which is a National Phase application of PCT Application No. PCT/EP2019/054377, filed on Feb. 21, 2019. This application claims the benefit under 35 U.S.C. § 119(a)-(d) of United Kingdom Patent Application No. 1802972.8, filed on Feb. 23, 2018 and United Kingdom Patent Application No. 1820023.8, filed on Dec. 7, 2018. All of the above-cited patent applications are incorporated herein by reference in their entirety.

DOMAIN OF THE INVENTION

The present invention regards the encoding or decoding of blocks of a given video component, in particular the intra prediction of such component blocks or obtaining the samples of such blocks. The invention finds applications in obtaining blocks of a component, typically blocks of a chroma component, of video data from samples of another component, typically luma samples.

BACKGROUND OF THE INVENTION

Predictive encoding of video data is based on the division of frames into blocks of pixels. For each block of pixels, a predictor block is searched for in available data. The predictor block may be a block in a reference frame different from the current one in INTER coding modes, or generated from neighbouring pixels in the current frame in INTRA coding modes. Different encoding modes are defined according to different ways of determining the predictor block. The result of the encoding is a signalling of the predictor block and a residual block consisting in the difference between the block to be encoded and the predictor block.

Regarding INTRA coding modes, various modes are usually proposed, such as a Direct Current (DC) mode, a planar mode and angular modes. Each of them seeks to predict samples of a block using previously decoded boundary samples from spatially neighbouring blocks.

The encoding may be performed for each component forming the pixels of the video data. Although RGB (for Red-Green-Blue) representation is well-known, the YUV representation is preferably used for the encoding to reduce the inter-channel redundancy. According to these encoding modes, a block of pixels may be considered as composed of several, typically three, component blocks. An RGB pixel block is composed of an R component block containing the values of the R component of the pixels of the block, a G component block containing the values of the G component of these pixels, a B component block containing the values of the B component of these pixels. Similarly, a YUV pixel block is composed of a Y component block (luma), a U component block (chroma) and a V component block (also chroma). Another example is YCbCr, where Cb and Cr are also known as chroma components. However, inter-component (also known as cross-component) correlation is still observed locally.

To improve compression efficiency, the usage of Cross-Component Prediction (CCP) has been studied in the state of this art. The main application of CCP concerns luma-to-chroma prediction. It means that the luma samples have already been encoded and reconstructed from encoded data (as the decoder does) and that chroma is predicted from luma. However, variants use CCP for chroma-to-chroma prediction or more generally for first-component to second-component prediction (including RGB).

The Cross-Component Prediction may apply directly to a block of chroma pixels or may apply to a residual chroma block (meaning the difference between a chroma block and a chroma block predictor).

The Linear Model (LM) mode uses a linear model to predict chroma from luma as a chroma intra prediction mode, relying on one or two parameters, slope ($\alpha$) and offset ($\beta$), to be determined. The chroma intra predictor is thus derived from reconstructed luma samples of a current luma block using the linear model with the parameters.

The linearity, i.e. parameters $\alpha$ and $\beta$, is derived from the reconstructed causal samples, in particular from a neighbouring chroma sample set comprising reconstructed chroma samples neighbouring the current chroma block to predict and from a neighbouring luma sample set comprising luma samples neighbouring the current luma block.

Specifically, for an N×N chroma block, the N neighbours of the above row and the N neighbours of the left column are used to form the neighbouring chroma sample set for derivation.

The neighbouring luma sample set is also made of N neighbouring samples just above the corresponding luma block and N neighbouring samples on the left side of the luma block.

It is known to reduce the size of the video data to encode without significant degradation of visual rendering, by sub-sampling the chroma components. Known subsampling modes are labelled 4:1:1, 4:2:2, 4:2:0.

In the situation where the video chroma data are sub-sampled, the luma block corresponding to the N×N chroma block is bigger than N×N. In that case, the neighbouring luma sample set is down-sampled to match the chroma resolution. The chroma intra predictor to predict the chroma samples in the current N×N chroma block has to be generated using the linear model with the one or more parameters $\alpha$ and $\beta$ derived and the reconstructed luma samples of the current luma block that are previously down-sampled to match chroma resolution. The down-sampling of the reconstructed luma samples to chroma resolution makes it possible to retrieve the same number of samples as the chroma samples to form both the luma sample set and the chroma intra predictor.

The chroma intra predictor is thus subtracted from the current chroma block to obtain a residual chroma block that is encoded at the encoder. Conversely, at the decoder, the chroma intra predictor is added to the received residual chroma block in order to retrieve the chroma block, also known as reconstruction of the decoded block. This may also involve clipping for results of the addition going out of the sample range.

Sometimes, the residual chroma block is negligible and thus not considered during encoding. In that case, the above-mentioned chroma intra predictor is used as the chroma block itself. As a consequence, the above LM mode makes it possible to obtain a sample for a current block of a given component from an associated (i.e. collocated or corresponding) reconstructed sample of a block of another component in the same frame using a linear model with one or more parameters. The sample is obtained using the linear model with the one or more parameters derived and the associated reconstructed samples in the block of the other component. If needed, the block of the other component is made of samples down-sampled to match the block resolution of the current component. While the block of the current component is typically a chroma block and the block of the other component a luma block, this may not be the case. For the sake of clarity and simplicity, the examples given here focus on the prediction of a chroma block from a luma block, it should be clear that the described mechanism may apply to any component prediction from another component.

The Joint Exploration Model (JEM) of the Joint Video Exploration Team (JVET) adds six Cross-Component (luma-to-chroma) linear model modes to the conventional intra prediction modes already known. All these modes compete against each other to predict or generate the chroma blocks, the selection being usually made based on a rate-distortion criterion at the encoder end.

The six Cross-Component (luma-to-chroma) linear model modes differ from each other by different down-sampling schemes used to down-sample the reconstructed luma samples and/or by different sample sets of samples from which the parameters $\alpha$ and $\beta$ are derived.

For instance, the sample sets may be made of the two lines (i.e. rows and columns) of samples neighbouring the current luma or chroma block, these lines being parallel and immediately adjacent to each one of the top and/or left boundaries of the current luma or chroma block at chroma resolution. Such exemplary sample set is described in publication U.S. Pat. No. 9,736,487.

Other exemplary sample sets are also disclosed in publications U.S. Pat. Nos. 9,288,500 and 9,462,273.

The down-sampling schemes used in JEM include a 6-tap filter determining a down-sampled reconstructed luma sample from six reconstructed luma samples but also three 2-tap filters that select either the top right and bottom right samples from among the six reconstructed luma samples, or the bottom and bottom right samples, or the top and top right samples, and a 4-tap filter that selects the top, top right, bottom and bottom right samples of the six reconstructed luma samples.

SUMMARY OF THE INVENTION

The JEM is complex in terms of processing. For instance, it requires a complex derivation of the linear model parameters for the computation of the chroma predictor block samples.

The present invention has been devised to address one or more of the foregoing concerns. It concerns an improved method for obtaining a chroma sample for a current chroma block, possibly through chroma intra prediction.

Further aspects of the invention are provided in the dependent claims.

According to a further aspect, there is provided a method of deriving a linear model for obtaining a first-component sample value from an associated reconstructed second-component sample value, the method comprising: taking two sets from two or more sets, each set comprising a first-component sample value and a second-component sample value from reconstructed sample values of the first-component and the second-component; and deriving the linear model based on a ratio of changes in the first-component sample values and the second-component sample values between the two sets so that the first-component sample values of the two sets are obtainable from the second-component sample values of the respective sets using the derived linear model.

It is understood that the first-component sample value and the associated reconstructed second-component sample value are associated with each other through a preset relationship.

Suitably, the preset relationship is that they are collocated with, or correspond to, each other. This collocated, or correspondence, relationship may be defined for each sample value individually, or between a block/group of first-component sample values and a block/group of second-component sample values.

Suitably, the preset relationship is that they are associated with at least one pixel of a current block of pixels to be processed, for example they are collocated, or corresponding, sample values of the at least one pixel that is to be processed. This collocated, or correspondence, relationship may be defined for each sample value individually, or between a block/group of sample values to a block/group of pixels.

It is also understood that a down-sampling or an up-sampling process may be applied to a block of first-component sample values or second-component sample values so that the preset relationship between the blocks, or with the at least one pixel of a current block of pixels, can be established after the down-sampling/up-sampling.

Suitably, the first-component sample value and the associated second-component sample value are associated with blocks of pixels of the same image, or frame, that is to be processed. It is understood that here a set comprising a first-component sample value and a second-component sample value is a component sample value set of the first-component sample value and the second-component sample value. So the set is an n-tuple with the first-component sample value and the second-component sample value as its elements. Suitably, the set is a 2-tuple. Alternatively, the set is an n-tuple which has more than two number of elements (n elements).

Suitably, the reconstructed sample values of the first-component and the second-component are associated with one or more blocks neighbouring a current block to be processed. Suitably, the one or more blocks neighbouring the current block are above or to the left of the current block.

Suitably, the taken two sets are the sets comprising the smallest second-component sample value and the largest second-component sample value among the second-component sample values in the two or more sets. Suitably, the taken two sets are the sets comprising the smallest first-component sample value and the largest first-component sample value among the first-component sample values in the two or more sets.

Suitably, the taking the two sets comprises: determining a first group of sets comprising the smallest second-component sample value and the largest second-component sample value among the second-component sample values in the two or more sets; determining a second group of sets comprising the smallest first-component sample value and the largest first-component sample value among the first-component sample values in the two or more sets; and selecting the two sets from the sets of the first group and the second group.

Suitably, the selecting the two sets from the sets of the first group and the second group comprises: selecting the first group if a difference between the smallest second-component sample value and the largest second-component sample value is larger than a different between the smallest first-component sample value and the largest first-component sample value; and selecting the second group if not.

Suitably, the selecting the two sets from the sets of the first group and the second group comprises: determining positions of sample values of sets of the first group and the second group; and selecting two sets based on the determined positions of the sample values. Suitably, the positions of sample values are determined for the reconstructed second-component sample values in relation to a block of reconstructed second-component sample values which is associated with a block of first-component sample values to be processed. Suitably, the positions of sample values are determined for the reconstructed first-component sample values in relation to a block of reconstructed first-component sample values to be processed. Suitably, the positions of sample values are determined based on associated/collocated/corresponding positions defined in relation to a block of pixels to be processed.

Suitably, the selecting two sets based on the determined positions of the sample values comprises selecting a set comprising a sample value at a predetermined position neighbouring a block to be processed. Suitably, the selecting two sets based on the determined positions of the sample values comprises: determining if any of the sets of the first group and the second group comprises a sample value at a predetermined position; and selecting the set comprising the sample value at the predetermined position as one of the two sets. Suitably, the selecting two sets based on the determined positions of the sample values comprises: if a set comprising a sample value at a predetermined position is not available, determine if any of the sets of the first group and the second group comprises a sample value at another predetermined position; and selecting the set comprising the sample value at the another predetermined position as one of the two sets. Suitably, the predetermined position or the another predetermined position is a left bottom or a right top position among the positions neighbouring a current block to be processed.

Suitably, the selecting the two sets from the first group and the second group of sets comprises comparing distances between two sets from the first group and the second group of sets, wherein the distances are defined in a space of first and second component sample values, which is defined by elements of sets so that each set of the two or more sets corresponds to a position in said space.

Suitably, the selecting the two sets compares: determining if a distance between the sets in the first group is larger than a distance between the sets in the second group; and selecting the first group if the distance between the sets in the first group is larger than the distance between the sets in the second group, and selecting the second group if not. Suitably, the selecting the two sets comprises selecting two sets with the largest distance there-between from the first group and the second group of sets.

Suitably, the selecting the two sets comprises: determining if corresponding elements of the sets in the first group have the same or different values; and selecting the first group if the corresponding elements does not have the same values or have different values, and selecting the second group if the corresponding elements have the same values or not have different values. Suitably, the corresponding elements of the sets are either one, or both, of the first-component sample values and the second-component sample values.

Suitably, the selecting the two sets comprises: determining if corresponding elements of the sets in the second group have the same or different values; and selecting the second group if the corresponding elements does not have the same values or have different values, and selecting the first group if the corresponding elements have the same values or not have different values.

Suitably, the selecting the two sets comprises: obtaining a ratio of changes in the first-component sample values and the second-component sample values between the sets of the first group; determining if the obtained ratio is greater than, equal to, or less than a preset value; and selecting the first group if the obtained ratio is greater than, equal to, or less than the preset value, and selecting the second group if not. Suitably, the selecting the two sets comprises: obtaining a ratio of changes in the first-component sample values and the second-component sample values between the sets of the second group; determining if the obtained ratio is greater than, equal to, or less than a preset value; and selecting the second group if the obtained ratio is greater than, equal to, or less than the preset value, and selecting the first group if not.

Suitably, the taken two sets are sets comprising second-component sample values from one or more blocks neighbouring a block of second-component sample values that is associated with a current block to be processed, and the taking two sets comprises selecting two sets based on their second-component sample values. Suitably, the taken two sets are sets comprising two most frequently occurring second-component sample values among the reconstructed sample values of the block of the corresponding second-component sample values.

Suitably, the reconstructed sample values of the second-component are divided into at least two groups, and, for each group, two sets are taken and a linear model is derived based the taken two sets. Suitably, if the two sets taken for a group have a ratio of changes in the first-component sample values and the second-component sample values between the sets less than or equal to a preset value, the linear model for that group is derived based on two sets taken for another group. Suitably, if the two sets taken for a group have a ratio of changes in the first-component sample values and the second-component sample values between the sets less than or equal to a preset value, the linear model for that group is derived based on two sets that would have been taken if all the reconstructed sample values of the second-component were in a single group.

According to a yet further aspect, there is provided a method of encoding or decoding one or more images into a bitstream or from a bitstream, the method comprising deriving a linear model for obtaining a first-component sample value from an associated reconstructed second-component sample value according to a method of the first aspect of the present invention.

Suitably, the method further comprises selecting one of a plurality of linear model derivation modes for obtaining the first-component sample value for a current block of the image to be processed, wherein the plurality of linear model derivation modes comprises a first mode using a single linear model and a second mode using more than one linear models, and the derived linear model is usable in the selected linear model derivation mode. Suitably, only the first mode uses the derived linear model. Alternatively, only the second mode uses the derived linear model.

According to a yet further aspect, there is provided a device for deriving a linear model for obtaining a first-component sample value from an associated reconstructed second-component sample value, the device configured to perform the method of the first aspect of the present invention.

According to a yet further aspect, there is provided a device for encoding or decoding one or more images into a bitstream or from a bitstream, the device configured to perform the method of the second aspect of the present invention.

According to a yet further aspect, there is provided a method of obtaining a first-component sample value from an associated reconstructed second-component sample value, the method comprising: selecting one linear model mode from a plurality of linear model modes for obtaining the first-component sample value; and obtaining the first-component sample value using the selected linear model mode, wherein at least one of the plurality of linear model modes uses a linear model derived using a method of derivation according to the first aspect of the present invention. Suitably, the plurality of linear model modes comprises a first mode using a single linear model and a second mode using more than one linear models. Suitably, only the first mode uses the method of derivation according to the first aspect of the present invention. Alternatively, only the second mode uses the method of derivation according to the first aspect of the present invention.

According to a yet further aspect, there is provided a device for obtaining a first-component sample value from an associated reconstructed second-component sample value, the device configured to perform the method of the fifth aspect of the present invention.

According to a yet further aspect, there is provided a method of encoding one or more images into a bitstream, wherein the method comprises obtaining a first-component sample value from an associated reconstructed second-component sample value according to the fifth aspect of the present invention. Suitably, the method further comprises providing, in the bitstream, information indicative of a selection for a linear model mode useable for obtaining the first-component sample.

According to an yet further aspect, there is provided a method of decoding one or more images from a bitstream, wherein the method comprises obtaining a first-component sample value from an associated reconstructed second-component sample value according to the fifth aspect of the present invention Suitably, the method further comprises obtaining, from the bitstream, information indicative of a selection for a linear model mode useable for obtaining the first-component sample, and the selecting one linear model mode from a plurality of linear model modes is performed based on the obtained information.

According to a yet further aspect, there is provided a device for encoding one or more images into a bitstream, the device configured to perform the method described herein.

According to a yet further aspect, there is provided a computer program which upon execution causes a method described herein to be performed and a (non-transitory) computer-readable medium storing instructions for implementing the method described herein.

According to the present invention there is provided a device, a method, a computer program (product), and a computer readable storage medium as set forth in the appended claims. Other features of embodiments of the invention are defined in the appended claims, and the description which follows. Some of these features are explained here below with reference to a method, while they can be transposed into system features dedicated to the device.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "processor and a memory", "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 5A schematically illustrates a 4:2:0 sampling format in which a single line of neighbouring luma samples RecL' is obtained from two lines of non down-sampled reconstructed luma samples RecL (left or up);

FIG. 5B schematically illustrates a 4:2:0 sampling format in which two lines of neighbouring luma samples are obtained (using down-sampling) from four lines of non down-sampled reconstructed luma samples;

DETAILED DESCRIPTION OF EMBODIMENTS

Figure 1:
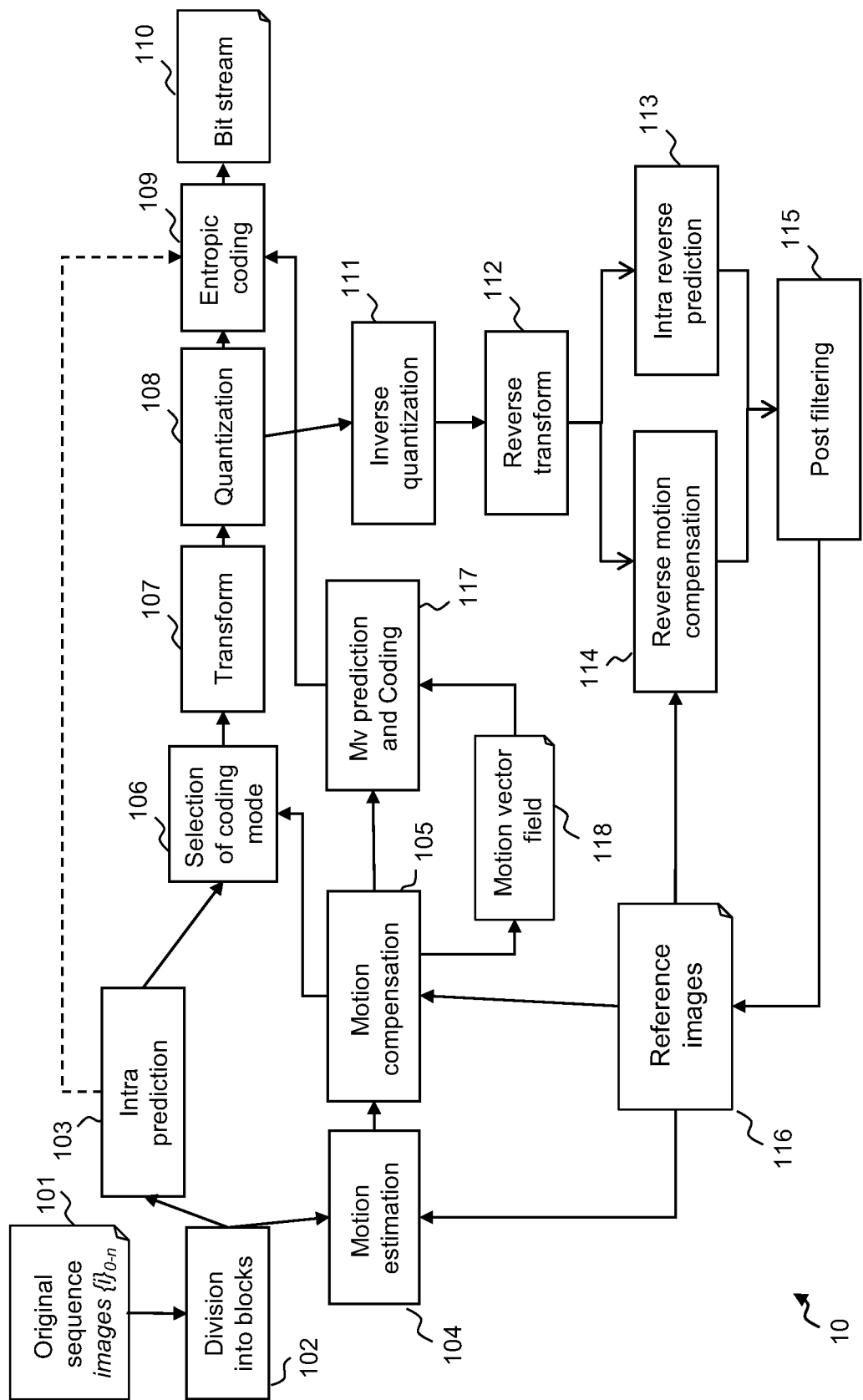
FIG. 1 illustrates a video encoder logical architecture.

FIG. 1 illustrates a video encoder architecture. In the video encoder, an original sequence 101 is divided into blocks of pixels 102 called coding blocks or coding units for HEVC. A coding mode is then affected to each block. There are two families of coding modes typically used video coding: the coding modes based on spatial prediction or "INTRA modes" 103 and the coding modes based on temporal prediction or "INTER modes" based on motion estimation 104 and motion compensation 105.

An INTRA coding block is generally predicted from the encoded pixels at its causal boundary by a process called INTRA prediction. The predictor for each pixel of the INTRA coding block thus forms a predictor block. Depending on which pixels are used to predict the INTRA coding block, various INTRA modes are proposed: for example, DC mode, a planar mode and angular modes.

While FIG. 1 is directed to a general description of a video encoder architecture, it is to be noted that a pixel corresponds here to an element of an image, that typically consists of several components, for example a red component, a green component, and a blue component. An image sample is an element of an image, that comprises only one component.

Temporal prediction first consists in finding in a previous or future frame, called the reference frame 116, a reference area which is the closest to the coding block in a motion estimation step 104. This reference area constitutes the predictor block. Next this coding block is predicted using the predictor block to compute the residue or residual block in a motion compensation step 105.

In both cases, spatial and temporal prediction, a residue or residual block is computed by subtracting the obtained predictor block from the coding block.

In the INTRA prediction, a prediction mode is encoded.

In the temporal prediction, an index indicating the reference frame used and a motion vector indicating the reference area in the reference frame are encoded. However, in order to further reduce the bitrate cost related to motion vector encoding, a motion vector is not directly encoded. Indeed, assuming that motion is homogeneous, it is particularly advantageous to encode a motion vector as a difference between this motion vector, and a motion vector (or motion vector predictor) in its surroundings. In the H.264/AVC coding standard for instance, motion vectors are encoded with respect to a median vector computed from the motion vectors associated with three blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighbouring motion vectors, used for the prediction, are extracted from the motion vector field 118.

The HEVC standard uses three different INTER modes: the Inter mode, the Merge mode and the Merge Skip mode, which mainly differ from each other by the signalling of the motion information (i.e. the motion vector and the associated reference frame through its so-called reference frame index) in the bit-stream 110. For the sake of simplicity, motion vector and motion information are conflated below. Regarding motion vector prediction, HEVC provides several candidates of motion vector predictor that are evaluated during a rate-distortion competition in order to find the best motion vector predictor or the best motion information for respectively the Inter or the Merge mode. An index corresponding to the best predictors or the best candidate of the motion information is inserted in the bitstream 110. Thanks to this signalling, the decoder can derive the same set of predictors or candidates and uses the best one according to the decoded index.

The design of the derivation of motion vector predictors and candidates contributes to achieving the best coding efficiency without large impact on complexity. Two motion vector derivations are proposed in HEVC: one for Inter mode (known as Advanced Motion Vector Prediction (AMVP)) and one for the Merge modes (known as Merge derivation process).

Next, the coding mode optimizing a rate-distortion criterion for the coding block currently considered is selected in module 106. In order to further reduce the redundancies within the obtained residue data, a transform, typically a DCT, is applied to the residual block in module 107, and a quantization is applied to the obtained coefficients in module 108. The quantized block of coefficients is then entropy coded in module 109 and the result is inserted into the bit-stream 110.

The encoder then performs decoding of each of the encoded blocks of the frame for the future motion estimation in modules 111 to 116. These steps allow the encoder and the decoder to have the same reference frames 116. To reconstruct the coded frame, each of the quantized and transformed residual blocks is inverse quantized in module 111 and inverse transformed in module 112 in order to provide the corresponding "reconstructed" residual block in the pixel domain. Due to the loss of the quantization, this "reconstructed" residual block differs from original residual block obtained at step 106.

Next, according to the coding mode selected at 106 (INTER or INTRA), this "reconstructed" residual block is added to the INTER predictor block 114 or to the INTRA predictor block 113, to obtain a "pre-reconstructed" block (coding block).

Next, the "pre-reconstructed" blocks are filtered in module 115 by one or several kinds of post filtering to obtain "reconstructed" blocks (coding blocks). The same post filters are integrated at the encoder (in the decoding loop) and at the decoder to be used in the same way in order to obtain exactly the same reference frames at encoder and decoder ends. The aim of this post filtering is to remove compression artefacts.

Figures 2, 3:
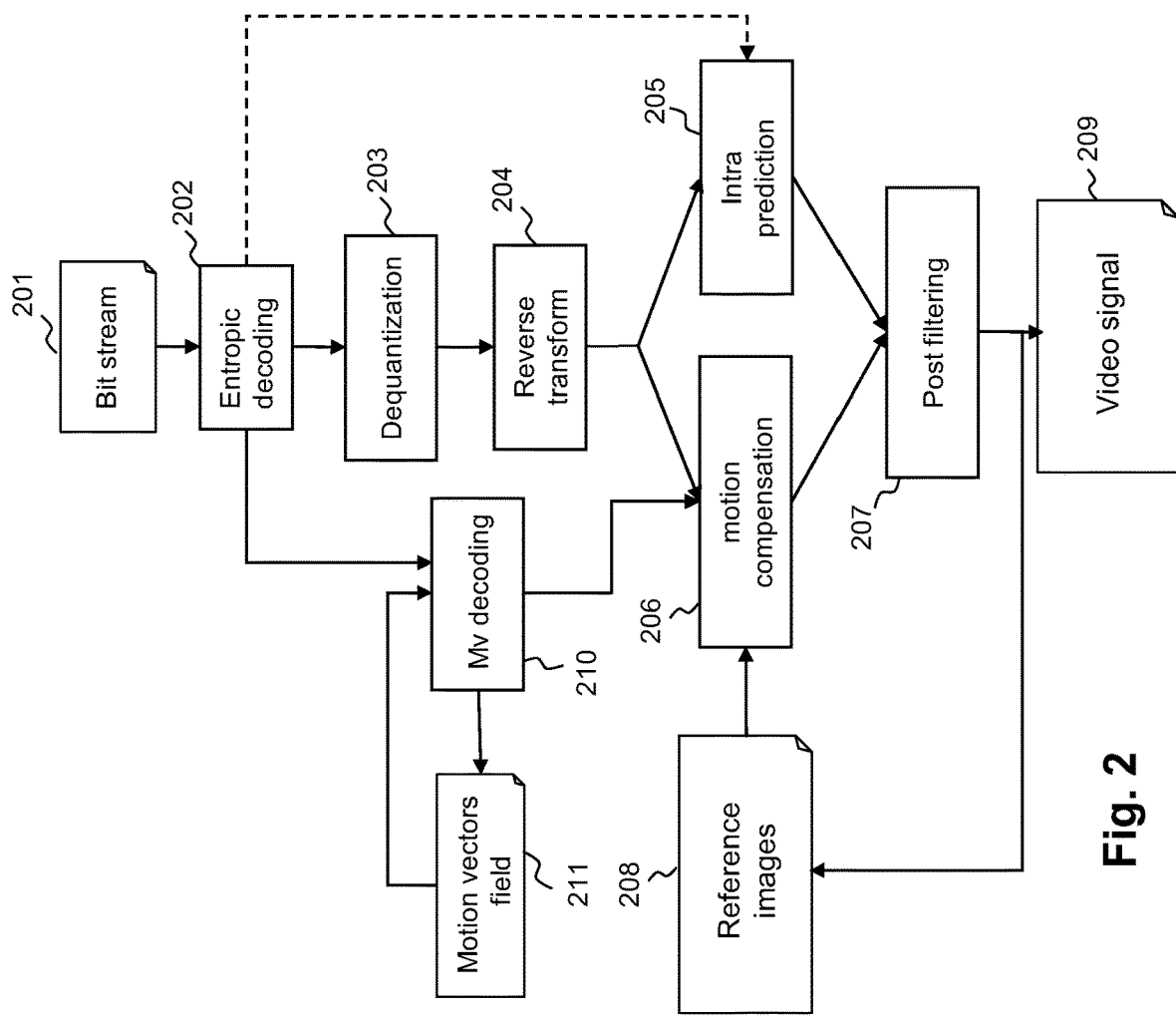
FIG. 2 illustrates a video decoder logical architecture corresponding to the video encoder logical architecture illustrated in FIG. 1.
FIG. 3 schematically illustrates examples of a YUV sampling scheme for 4:2:0 sampling.

FIG. 2 illustrates a video decoder architecture corresponding to the video encoder architecture illustrated in FIG. 1.

The video stream 201 is first entropy decoded in a module 202. Each obtained residual block (coding block) is then inverse quantized in a module 203 and inverse transformed in a module 204 to obtain a "reconstructed" residual block. This is similar to the beginning of the decoding loop at the encoder end.

Next, according to the decoding mode indicated in the bitstream 201 (either INTRA type decoding or an INTER type decoding), a predictor block is built.

In case of INTRA mode, an INTRA predictor block is determined 205 based on the INTRA prediction mode specified in the bit-stream 201.

In case of INTER mode, the motion information is extracted from the bitstream during the entropy decoding 202. The motion information is composed, for example in HEVC and JVET, of a reference frame index and a motion vector residual.

A motion vector predictor is obtained in the same way as done by the encoder (from neighbouring blocks) using already computed motion vectors stored in motion vector field data 211. It is thus added 210 to the extracted motion vector residual block to obtain the motion vector. This motion vector is added to the motion vector field data 211 in order to be used for the prediction of the next decoded motion vectors.

The motion vector is also used to locate the reference area in the reference frame 206 which is the INTER predictor block.

Next, the "reconstructed" residual block obtained at 204 is added to the INTER predictor block 206 or to the INTRA predictor block 205, to obtain a "pre-reconstructed" block (coding block) in the same way as the decoding loop of the encoder.

Next, this "pre-reconstructed" block is post filtered in module 207 as done at the encoder end (signalling of the post filtering to use may be retrieved from bitstream 201).

A "reconstructed" block (coding block) is thus obtained which forms the de-compressed video 209 as the output of the decoder.

The above-described encoding/decoding process may be applied to monochrome frames. However, most common frames are colour frames generally made of three arrays of colour samples, each array corresponding to a "colour component", for instance R (red), G (green) and B (blue). A pixel of the image comprises three collocated/corresponding samples, one for each component.

R, G, B components have usually high correlation between them. It is thus very common in image and video compression to decorrelate the colour components prior to processing the frames, by converting them in another colour space. The most common format is the YUV (YCbCr) where Y is the luma (or luminance) component, and U (Cb) and V (Cr) are chroma (or chrominance) components.

To reduce the amount of data to process, some colour components of the colour frames may be subsampled, resulting in having different sampling ratios for the three colour components. A subsampling scheme is commonly expressed as a three part ratio J:a:b that describes the number of luma and chroma samples in a conceptual 2-pixel-high region. 'J' defines the horizontal sampling reference of the conceptual region (i.e. a width in pixels), usually 4. 'a' defines the number of chroma samples (Cr, Cb) in the first row of J pixels, while 'b' defines the number of (additional) chroma samples (Cr, Cb) in the second row of J pixels.

With the subsampling schemes, the number of chroma samples is reduced compared to the number of luma samples.

The 4:4:4 YUV or RGB format does not provide subsampling and corresponds to a non-subsampled frame where the luma and chroma frames have the same size W×H.

The 4:0:0 YUV or RGB format has only one colour component and thus corresponds to a monochrome frame.

Exemplary sampling formats are the following.

The 4:2:0 YUV format has half as many chroma samples as luma samples in the first row, and no chroma samples in the second row. The two chroma frames are thus W/2-pixel wide and H/2-pixel height, where the luma frame is W×H.

The 4:2:2 YUV format has half as many chroma samples in the first row and half as many chroma samples in the second raw, as luma samples. The two chroma frames are thus W/2-pixel wide and H-pixel height, where the luma frame is W×H.

The 4:1:1 YUV format has 75% fewer chroma samples in the first row and 75% fewer chroma samples in the second row, than the luma samples. The two chroma frames are thus W/4-pixel wide and H-pixel height, where the luma frame is W×H.

When subsampled, the positions of the chroma samples in the frames are shifted compared to the luma sample positions.

FIG. 3 illustrates an exemplary positioning of chroma samples (triangles) with respect to luma samples (circles) for a 4:2:0 YUV frame.

The encoding process of FIG. 1 may be applied to each colour-component frame of an input frame.

Due to correlations between the colour components (between RGB or remaining correlations between YUV despite the RGB-to-YUV conversion), Cross-Component Prediction (CCP) methods have been developed to exploit these (remaining) correlations in order to improve coding efficiency.

CCP methods can be applied at different stages of the encoding or the decoding process, in particular either at a first prediction stage (to predict a current colour component) or at a second prediction stage (to predict a current residual block of a component).

One known CCP method is the LM mode, also referred as to CCLM (Cross-Component Linear Model prediction). It is used to predict both chroma components Cb and Cr (or U and V) from the luma Y, more specifically from the reconstructed luma (at the encoder end or at the decoder end). One predictor is generated for each component. The method operates at a (chroma and luma) block level, for instance at CTU (coding tree unit), CU (coding unit) level, PU (prediction unit) level, sub-PU or TU (transform unit) level.

Figure 4:
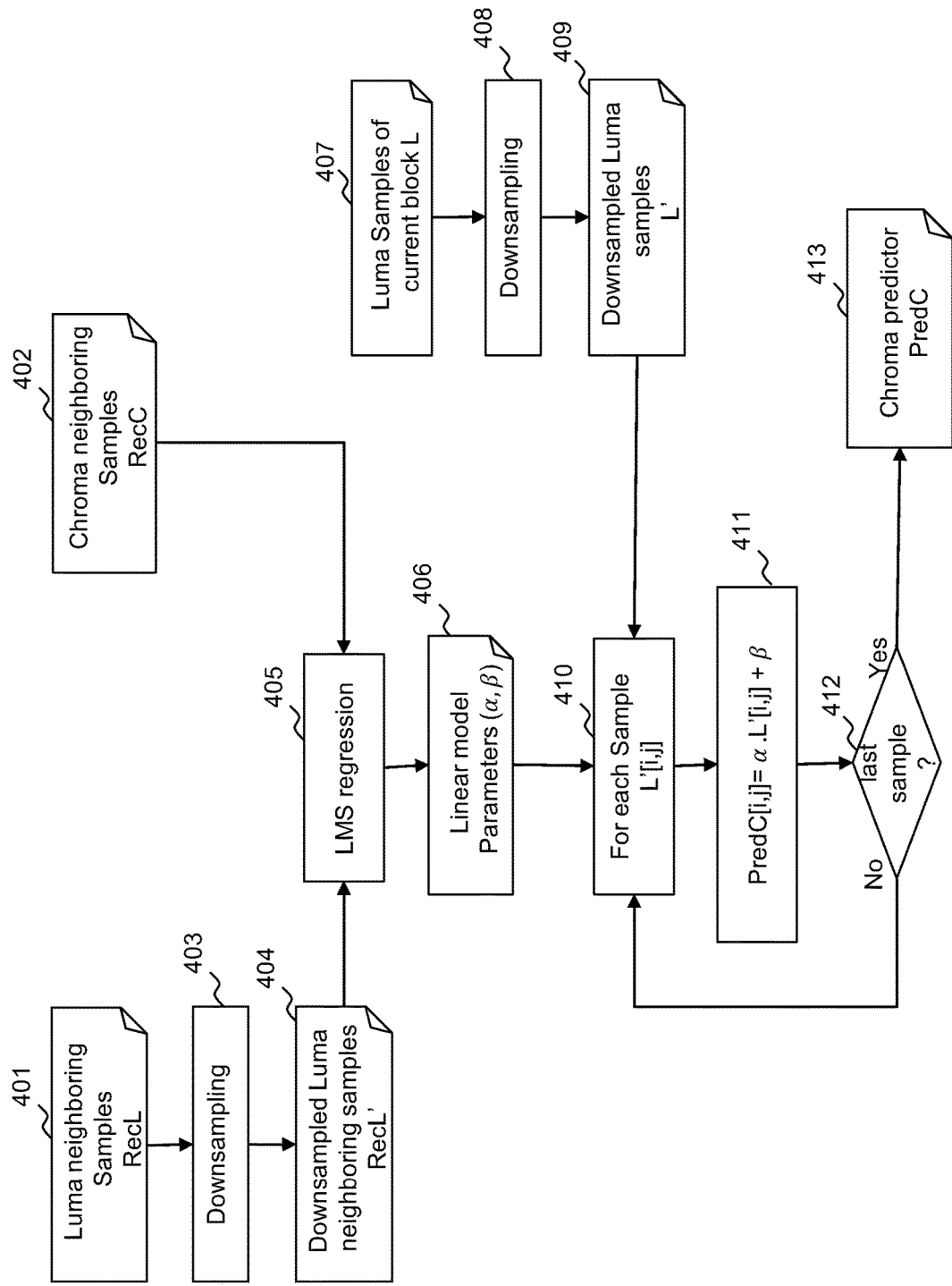
FIG. 4 illustrates, using a flowchart, general steps for generating a block predictor using the LM mode, performed either by an encoder or a decoder.

FIG. 4 illustrates as an example, using a flowchart, general steps for generating a block predictor using the LM mode, performed either by the encoder (used as reference below) or the decoder.

In the description below, an exemplary first component is chroma while an exemplary second component is luma.

Considering a current chroma block 502 (FIG. 5A) to encode or decode and its associated or corresponding (i.e. "collocated") luma block 505 (i.e. of the same CU for instance) in the same frame, the encoder (or the decoder) receives, in step 401, a neighbouring luma sample set RecL comprising luma samples 503 neighbouring the current luma block, and receives a neighbouring chroma sample set RecC comprising chroma samples 501 neighbouring the current chroma block, denoted 402. It is to be noted that for some chroma sampling formats and chroma phase, the luma samples 504 and 503 are not directly adjacent to luma block 505 as depicted in FIG. 5A. For example in FIG. 5A, to obtain the left row RecL' (503), only the second left row is needed and not the direct left row. In the same way, for the up line 504 the second up line is also considered for the down-sampling of luma sample as depicted in FIG. 5A.

When a chroma sampling format is used (e.g. 4:2:0, 4:2:2, etc.), the neighbouring luma sample set is down-sampled at step 403 into RecL' 404 to match chroma resolution (i.e. the sample resolution of the corresponding chroma frame/block). RecL' thus comprises reconstructed luma samples 504 neighbouring the current luma block that are down-sampled. Thanks to the down-sampling, RecL' and RecC comprise the same number 2N of samples (chroma block 502 being N×N). Yet, particular down-samplings of the luma border exist in the prior art where less samples are needed to obtain RecL'. In addition, even if RecL and RecC have the same resolution, RecL' can be seen as the denoised version of RecL, through the use of a low-pass convolution filter.

In the example of FIG. 5A, the neighbouring luma and chroma sample sets are made of the down-sampled top and left neighbouring luma samples and of the top and left neighbouring chroma samples, respectively. More precisely each of the two sample sets is made of the first line immediately adjacent to the left boundary and the first line immediately adjacent to the top boundary of their respective luma or chroma block. Due to down-sampling (4:2:0 in FIG. 5A), the single line of neighbouring luma samples RecL' is obtained from two lines of non down-sampled reconstructed luma samples RecL (left or up).

Figure 6A:
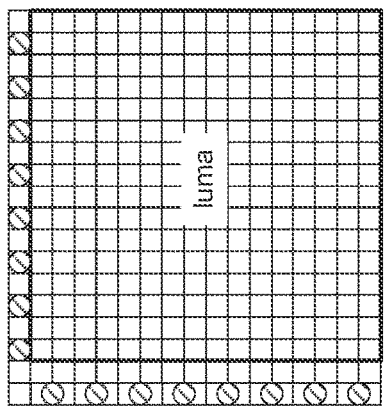
FIG. 6A schematically illustrates a single sample set on a line adjacent to a top boundary of a luma block.

U.S. Pat. No. 9,565,428 suggests using sub-sampling which selects a single sample, only for the up line (i.e. adjacent to the top boundary of the luma block) and not for the luma block itself (as described below with reference to step 408). The proposed sub-sampling is illustrated in FIG. 6A. The motivation for this approach is to reduce the line buffer of the up line.

The linear model which is defined by one or two parameters (a slope $\alpha$ and an offset $\beta$) is derived from RecL' (if any, otherwise RecL) and RecC. This is step 405 to obtain the parameters 406.

The LM parameters $\alpha$ and $\beta$ are obtained using a least mean square-based method using the following equations:

$$\alpha = \frac{M \cdot \sum_{i=1}^{M} RecC_i \cdot RecL'_i - \sum_{i=1}^{M} RecC_i \cdot \sum_{i=1}^{M} RecL'_i}{M \cdot \sum_{i=1}^{M} RecL'^2_i - \left(\sum_{i=1}^{M} RecL'_i\right)^2} = \frac{A_1}{A_2}$$

$$\beta = \frac{\sum_{i=1}^{M} RecC_i - \alpha \cdot \sum_{i=1}^{M} RecL'_i}{M}$$

where M is a value which depends on the size of the block considered. In general cases of square blocks as shown in the FIGS. 5A and 5B, M=2N. However, the LM-based CCP may apply to any block shape where M is for instance the sum of the block height H plus the block width W (for a rectangular block shape).

It is to be noted that the value of M used as a weight in this equation may be adjusted to avoid computational overflows at the encoder and decoder. To be precise, when using arithmetic with 32-bit or 64-bit signed architectures, some of the computations may sometimes overflow and thus cause unspecified behaviour (which is strictly prohibited in any cross platform standard). To face this situation, the maximum magnitude possible given inputs RecL' and RecC values may be evaluated, and M (and in turn the sums above) may be scaled accordingly to ensure that no overflow occurs.

The derivation of the parameters is usually made from the sample sets RecL' and RecC shown in FIG. 5A.

Variations of the sample sets have been proposed.

Figure 6B:
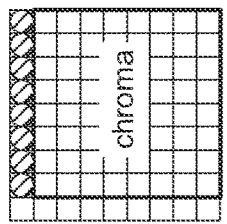
FIG. 6B schematically illustrates three competing sample sets, including a first sample set on an outer line adjacent to a top boundary of a chroma block and an outer line adjacent to a left boundary of the chroma block, a second sample set on only the outer line adjacent to the left boundary of a chroma block and a third sample set on only the outer line adjacent to the top boundary of a chroma block.
Figure 6B:
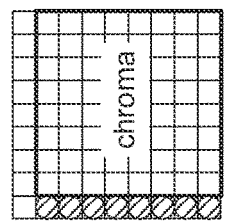
Figure 6B:
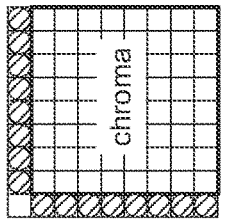

For instance, U.S. Pat. No. 9,288,500 proposes three competing sample sets, including a first sample set made of the outer line adjacent to the top boundary and the outer line adjacent to the left boundary, a second sample set made of only the outer line adjacent to the left boundary and a third sample set made of only the outer line adjacent to the top boundary. These three sample sets are shown in FIG. 6B for the chroma block only (and thus can be transposed to the luma block).

Figure 6C:
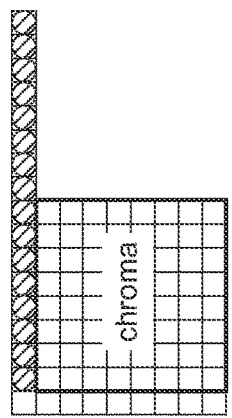
FIG. 6C schematically illustrates the three competing sample sets of FIG. 6B, and extends the second and third sample sets to additional samples extending the outer lines.

U.S. Pat. No. 9,462,273 extends the second and third sample sets to additional samples extending the outer lines (usually doubling their length). The extended sample sets are shown in FIG. 6C for the chroma block only. This document also provides a reduction in the number of LM modes available in order to decrease the signalling costs for signalling the LM mode used in the bitstream. The reduction may be contextual, for instance based on the Intra mode selected for the associated luma block.

Figure 6D:
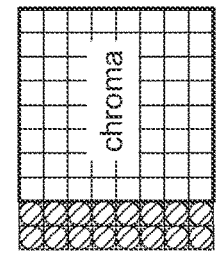
FIG. 6D schematically illustrates three competing sample sets, made, each time, of the two lines of outer neighbouring samples parallel and immediately adjacent to the boundaries considered.
Figure 6D:
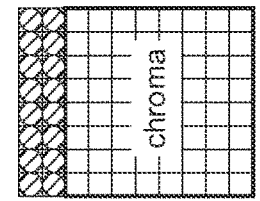
Figure 6D:
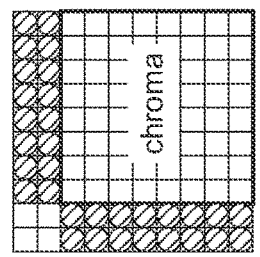

U.S. Pat. No. 9,736,487 proposes three competing sample sets similar to those of U.S. Pat. No. 9,288,500 but made, each time, of the two lines of outer neighbouring samples parallel and immediately adjacent to the boundaries considered. These sample sets are shown in FIG. 6D for the chroma block only.

Also U.S. Pat. No. 9,153,040 and the documents of the same patent family propose additional sample sets made of a single line per boundary, with less samples per line than the previous sets.

Back to the process of FIG. 4, using the linear model with the one or more derived parameters 406, a chroma intra predictor 413 for chroma block 502 may thus be obtained from the reconstructed luma samples 407 of the current luma block represented in 505. Again if a chroma sampling format is used (e.g. 4:2:0, 4:2:2, etc.), the reconstructed luma samples are down-sampled at step 408 into L' 409 to match chroma resolution (i.e. the sample resolution of the corresponding chroma frame/block).

The same down-sampling as for step 403 may be used, or another one for a line buffer reason. For instance, a 6-tap filter may be used to provide the down-sampled value as a weighted sum of the top left, top, top right, bottom left, bottom and bottom right samples surrounding the down-sampling position. When some surrounding samples are missing, a mere 2-tap filter is used instead of the 6-tap filter.

Applied to reconstructed luma samples L, output L' of an exemplary 6-tap filter is obtained as follows:

$L'[i,j]=(2 \times L[2i,2j]+2 \times L[2i,2j+1]+L[2i-1,2j]+L[2i+1,2j]+L[2i-1,2j+1]+L[2i+1,2j+1]+4)>>3$ with (i,j) being the coordinates of the sample within the down-sampled block and >> being the bit-right-shifting operation.

Also an adaptive luma down-sampling may be used as described in US 2017/0244975. Only the content of the luma block is used to determine which down-sampling filter is used for each reconstructed luma sample of the luma block. A 1-tap filter is available. The motivation of this approach is to avoid propagation of an edge in the down-sampled luma block.

Thanks to down-sampling step 408, L' and C blocks (the set of chroma samples in chroma block 502) comprise the same number $N^2$ of samples (chroma block 502 being N×N).

Next, each sample of the chroma intra predictor PredC 413 is calculated using the loop 410-411-412 following the formula $$PredC[i,j] = \alpha \cdot L'[i,j] + \beta \qquad 5$$

with (i,j) being the coordinates of all samples within the chroma and luma blocks.

To avoid divisions and multiplications, the computations may be implemented using less complex methods based on look-up tables and shift operations. For instance, the actual chroma intra predictor derivation 411 may be done as follows:

$$PredC[i,j] = (A \cdot L'[i,j]) >> S + \beta$$

where S is an integer and A is derived from A1 and A2 (introduced above when computing $\alpha$ and $\beta$) using the look-up table mentioned previously. It actually corresponds to a rescaled value of a. The operation (x>>S) corresponds to the bit-right-shifting operation, equivalent to an integer division of x (with truncation) by 2S.

When all samples of the down-sampled luma block have been parsed (412), the chroma intra predictor 413 is available for subtraction from chroma block 502 (to obtain a chroma residual block) at the encoder end or for addition to a chroma residual block (to obtain a reconstructed chroma block) at the decoder end.

Note that the chroma residual block may be insignificant and thus discarded, in which case the obtained chroma intra predictor 413 directly corresponds to predicted chroma samples (forming chroma block 502).

Both standardization groups ITU-T VCEG (Q6/16) and ISO/IEC MPEG (JTC 1/SC 29/WG 11) which have defined the HEVC standard are studying future video coding technologies for the successor of HEVC in a joint collaboration effort known as the Joint Video Exploration Team (JVET). The Joint Exploration Model (JEM) contains HEVC tools and new added tools selected by this JVET group. In particular, this reference software contains some CCP tools, as described in document JVET-G1001.

In the JEM, a total of 11 intra modes are allowed for chroma coding. Those modes include five traditional intra modes and six cross-component LM modes to predict Cb from Y (signalled in bitstream 110, 201) and one cross-component LM mode to predict Cr from Cb.

One of the six Y-to-Cb CC LM modes is the CCLM described above, in which the neighbouring luma and chroma sample sets RecL' and RecC are each made of the first line immediately adjacent to the left boundary and the first line immediately adjacent to the top boundary of their respective luma or chroma block as shown in FIG. 5A.

The five other Y-to-Cb CC LM modes are based on a particular derivation known as the Multiple Model (MM). These modes are labelled MMLM.

Compared to CCLM, the MMLM modes use two linear models. The neighbouring reconstructed luma samples from the RecL' set and the neighbouring chroma samples from the RecC set are classified into two groups, each group being used to derive the parameters $\alpha$ and $\beta$ of one linear model, thus resulting in two sets of linear model parameters ($\alpha_1, \beta_1$) and ($\alpha_2, \beta_2$).

For instance, a threshold may be calculated as the average value of the neighbouring reconstructed luma samples forming RecL'. Next, a neighbouring luma sample with RecL'[i,j] $\leq$ threshold is classified into group 1; while a neighbouring luma sample with RecL'[i,j]>threshold is classified into group 2.

Next, the chroma intra predictor (or the predicted chroma samples for current chroma block 602) is obtained according to the following formulas:

$$PredC[i,j] = \alpha_1 \cdot L'[i,j] + \beta_1, \text{ if } L'[i,j] \leq \text{threshold}$$

$$PredC[i,j] = \alpha_2 \cdot L'[i,j] + \beta_2, \text{ if } L'[i,j] > \text{threshold}$$

In addition, compared to CCLM, the MMLM modes use neighbouring luma and chroma sample sets RecL' and RecC, each made of the two lines of outer neighbouring samples parallel and immediately adjacent to the left and top boundaries of the block considered. An example is shown in FIG. 5B illustrating a 4:2:0 sampling format for which the two lines of neighbouring luma samples are obtained (using down-sampling) from four lines of non down-sampled reconstructed luma samples.

The five MMLM modes differ from each other by five different down-sampling filters to down-sample the reconstructed luma samples to match chroma resolution (to obtain RecL' and/or L').

Figure 7:
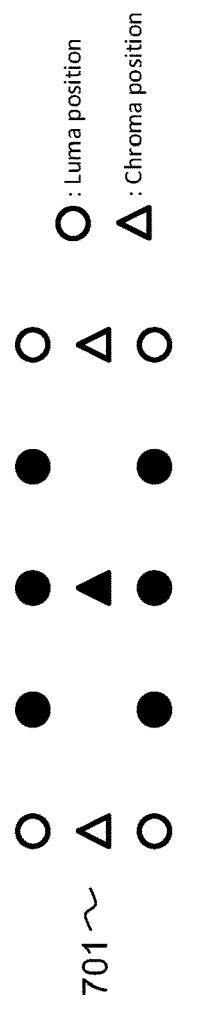
FIG. 7 illustrates some down-sampling filters known in prior art.

A first MMLM mode relies on the same 6-tap filter as used in CCLM (see the 6 black points in reference 701 of FIG. 7). The second to fourth MMLM modes rely on 2-tap filters which respectively provide the down-sampled value as a weighted sum of:

the top right and bottom right samples of the six samples (used by the 6-tap filter) surrounding the down-sampling position (see filter 1, 702 of FIG. 7):

$$L'[i,j] = (L[2i+1, 2j] + L[2i+1, 2j+Z1] + 1) >> 1 \text{ (the same applies with RecL),}$$

the bottom and bottom right samples of the six samples (used by the 6-tap filter) surrounding the down-sampling position (see filter 2, 703 of FIG. 7):

$$L'[i,j] = (L[2i, 2j+1] + L[2i+1, 2j+1] + 1) >> 1, \text{ and}$$

the top and top right samples of the six samples (used by the 6-tap filter) surrounding the down-sampling position (see filter 4, 705 of FIG. 7):

$$L'[i,j] = (L[2i, 2j] + L[2i+1, 2j] + 1) > 1.$$

The fifth MMLM mode relies on 4-tap filter which provides the down-sampled value as the weighted sum of the top, top right, bottom and bottom right samples of the six samples (used by the 6-tap filter) surrounding the down-sampling position (see filter 3, 704 of FIG. 7):

$$L'[i,j] = (L[2i, 2j] + L[2i, 2j+1] + L[2i+1, 2j] + L[2i1, 2j+1] + 2) >> 2.$$

Figure 8:
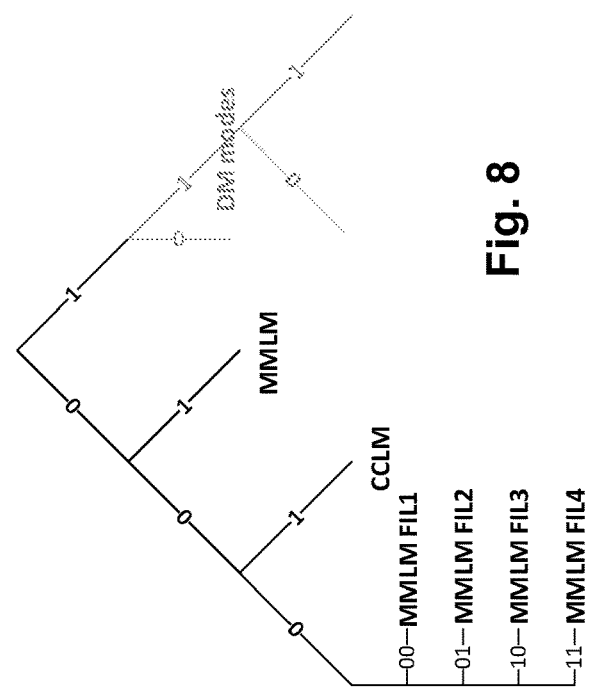
FIG. 8 illustrates exemplary coding of signalling flags to signal LM modes.

As indicated above, the CCLM or MMLM mode has to be signalled in the bitstream 110 or 201. FIG. 8 illustrates an exemplary LM mode signalling of JEM. A first binary flag indicates whether the current block is predicted using an LM mode or other intra modes, including so-called DM modes. In case of LM mode, the six possible LM modes need to be signalled. The first MMLM mode (using the 6-tap filter) is signalled with one second binary flag set to 1. This second binary flag is set to 0 for the remaining modes, in which case a third binary flag is set to 1 to signal the CCLM mode and is set to 0 for the remaining MMLM modes. Two additional binary flags are then used to signal one of the four remaining MMLM modes.

One mode is signalled for each chroma component.

The Cb-to-Cr CCLM mode introduced above is used in DM modes, and applies at residual level. Indeed, a DM mode uses for chroma the intra mode which was used by luma in a predetermined location. Traditionally, a coding mode like HEVC uses one single DM mode, co-located with the top-left corner of the CU. Without going in too many details, and for the sake of clarity, JVET provides several such locations. This mode is then used to determine the prediction method, therefore creating a usual intra prediction for a chroma component which, when subtracted from the reference/original data, yield aforementioned residual data. The prediction for the Cr residual is obtained from the Cb residual (ResidualCb below) by the following formula:

PredCr[i,j]=α·ResidualCb[i,j]

where α is derived in a similar way as in the CCLM luma-to-chroma prediction. The only difference is the addition of a regression cost relative to a default α value in the error function so that the derived scaling factor is biased towards a default value of −0.5 as follows:

$$\alpha = \frac{M \cdot \sum_{i=1}^{M} RecCb_i \cdot RecCr_i - \sum_{i=1}^{M} RecCb_i \cdot \sum_{i=1}^{M} RecL'_i + \lambda(-0.5)}{M \cdot \sum_{i=1}^{M} RecCb_i^2 - \left(\sum_{i=1}^{M} RecCb_i\right)^2 + \lambda}$$

where $RecCb_i$ represents the values of neighbouring reconstructed Cb samples, $RecCr_i$ represents the neighbouring reconstructed Cr samples, and $\lambda = \Sigma_{i=1}^{M} RecCb_i^2 >> 9$.

The known LM modes exhibit a large computation complexity, in particular when deriving the linear model parameter using least square based methods.

The present invention seeks to improve the situation in term of coding efficiency and/or computational complexity.

The invention is based on the replacement of the derivation of a linear model used to compute chroma predictor block samples from luma block samples by determination of the parameters of the linear model based on the equation of a straight line. The straight line is defined by two sample pairs defined based on reconstructed sample pairs in the neighbourhood of the block. First the two sample pairs to be used are determined. Then the parameters of the linear model are determined from these two sample pairs. By limiting to two the number of sample pairs used in the determination of the linear model, the use of a least mean square method can be avoided. The proposed method is therefore less computation intensive than the known method using a least mean square method.

Figure 9:
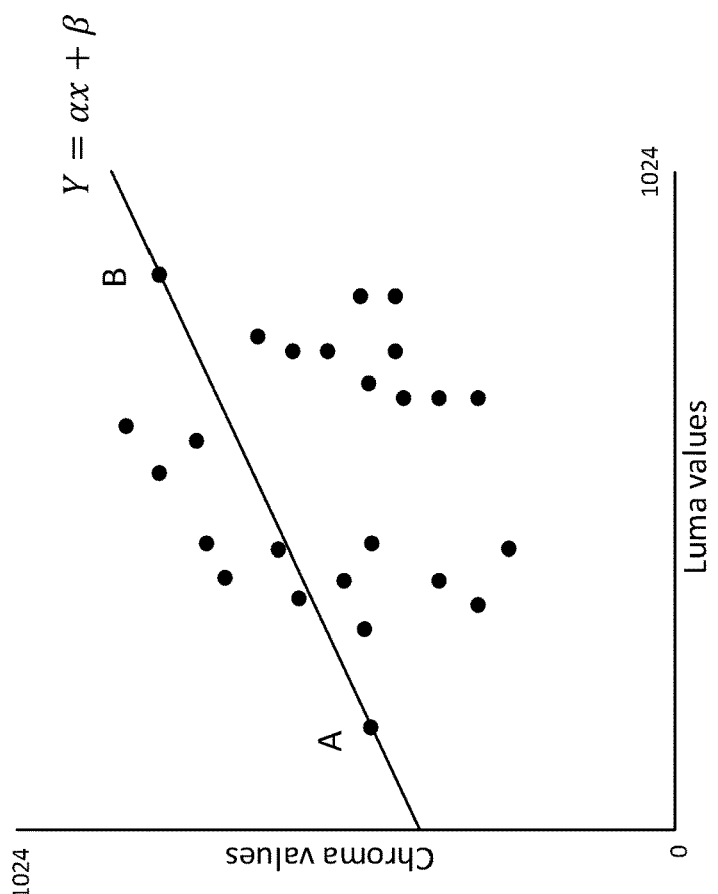
FIG. 9 illustrates points of luma and chroma neighboring samples and a straight line representing the linear model parameters obtained in one embodiment of the invention.

FIG. 9 illustrates the principle of this method by considering here the minimum and the maximum of luma sample values in the set of sample pairs in the neighborhood of the current block. All the sample pairs are drawn on the figure according to their chroma value and their luma value. Two different points, namely point A and point B are identified on the figure, each point corresponding to a sample pair. Point A corresponds to the sample pair with the lowest luma value $x_A$ from RecL' and $y_A$ its collocated chroma value from RecC. Point B corresponds to the sample pair with the highest luma value $x_B$ and $y_B$ its collocated chroma value.

Figure 10:
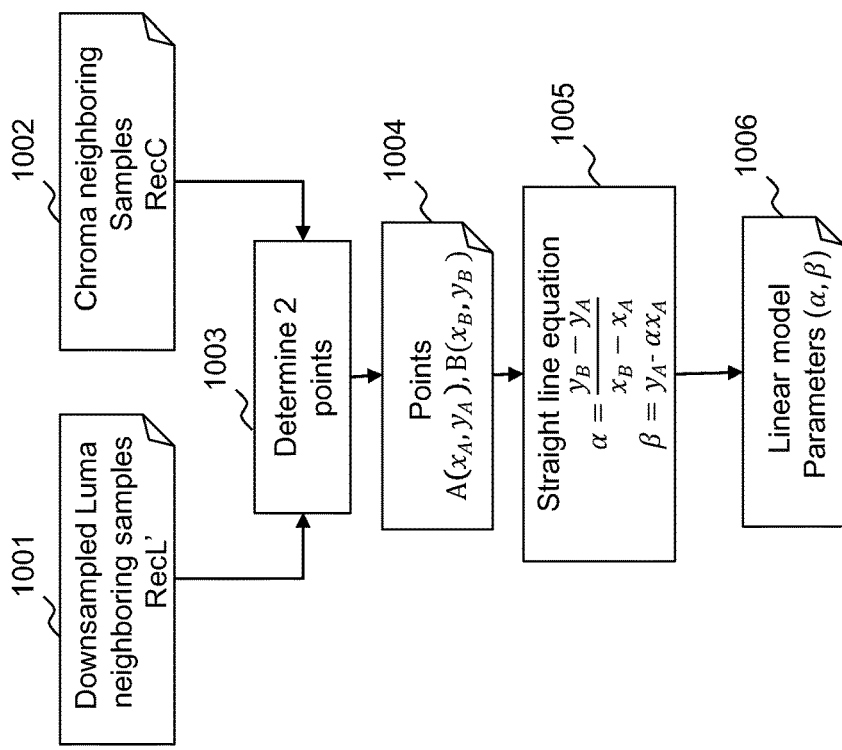
FIG. 10 illustrates the main steps of a process of the simplified LM derivation in one embodiment of the invention.

FIG. 10 gives the flow chart of a proposed method to derive the linear model parameters. This flow chart is a simplified version of FIG. 4. The method is based on the neighboring luma samples RecL' obtained in step 1001 and chroma samples RecC obtained in step 1002.

In a step 1003, the two points A and B (1004) corresponding to two sample pairs are determined. In a first embodiment, these two points A and B correspond to the sample pairs with respectively the lowest and highest luma sample values $x_A$ and $x_B$ with their corresponding chroma sample values $y_A$ and $y_B$.

Then the straight line equation which crosses the points A and B is computed in a step 1005 according to the following equation:

$$\alpha = \frac{y_B - y_A}{x_B - x_A}$$

$\beta = y_A - \alpha x_A$

The obtained α, β are the linear model parameters 1006 used to generate the chroma predictor.

The linear model derivation based on the LMS algorithm used in the prior art has a certain complexity. In this known method, the computation of the a parameter of the model is obtained by the following equation:

$$\alpha = \frac{M \sum_{i=1}^{M} RecC_i RecL'_i - \sum_{i=1}^{M} RecC_i \sum_{i=1}^{M} RecL'_i}{M \sum_{i=1}^{M} RecL'^2_i - \left(\sum_{i=1}^{M} RecL'_i\right)^2} = \frac{B_1 - B_2}{B_3 - B_4} = \frac{A_1}{A_2}$$

The analysis of this equation regarding the computation complexity gives the following results. The computation of $B_1$ requires M+1 multiplications and M sums, M being the number of sample pairs. The computation of $B_2$ requires 1 multiplication and 2M sums. The computation of $B_3$ requires M+1 multiplication and M sums and the computation of $B_4$ requires one multiplication and 2M sums. The computation of α corresponding to $$\frac{B_1 - B_2}{B_3 - B_4}$$

requires two additional sums and one division.

To compute β one multiplication and 2M+1 sums and one division. As described previously M is the number of pairs of samples $RecC_i$ and $RecL'_i$.

The complexity of the LMS derivation of α and β is therefore (2M+2+2) multiplications, (7M+3) additions and two divisions.

In comparison, the analysis of the proposed method based on the computation of the equation of a straight line using only two points gives the following results. As reported, the derivation step 1005 requires only one multiplication, three sums and one division. This large complexity reduction in generating the linear model parameters is a major advantage of the proposed invention.

It should be noted that the search for the minimum and maximum values has a complexity of its own, typically related to sorting algorithm. The operation is not completely serial: N points can be compared to N other points, generating N minimum/maximum. Then N/2 minimum and N/2 maximum points can be compared to the N/2 others, then again N/4 and so on until only the desired numbers of minimum and maximum points remain. Typically, the search for the minimum and maximum thus results in approximatively 2*N−2 comparisons (N−1 for each).

As already described, the chroma predictor can be calculated with an integer multiplication and a shift instead of a floating-point multiplication, and a division when computing the slope. This simplification consists in replacing:

$pred_C(i,j) = \alpha \cdot rec_L'^{(i,j)} + \beta$

By:

$$\text{pred}_C(i,j) = (L \cdot \text{rec}_L{'}^{(i,j)}) >> S + \beta$$

To use only integer multiplication and shift, in one embodiment, the straight line equation is obtained as follows:

$$S = 10$$

$$L = \frac{(y_B - y_A) \ll S}{x_B - x_A}$$

$$\beta = y_A - L(x_A >> S)$$

Please note that β refers to this equation in the following if α is replaced by L and S otherwise it refers to the traditional equation $\beta = y_A - \alpha x_A$.

Another advantage of this derivation is that the shift value S always has the same value. This is interesting especially for hardware implementation that can be made simpler in taking advantage of this property.

In yet another embodiment, the value of S is forced to be low, as L could be large, and requires larger multiplier operations. Indeed, a multiply of 8 bits values by a 8-bits value is much easier to implement than e.g. a 8*16 multiplier. Typical practical values for L are often equivalent to a multiplier less than 8 bits.

However, the preferred embodiment is an implementation known as fixed point: for every value of $D=(x_B - x_A)$, possibly quantized (e.g. the results for 2D+0 and 2D+1 are stored as a single one), the value of (1>>S)/D is stored in a table. Preferably, these are only for the positive values, as the sign can be easily retrieved. Using an array TAB, the computation of L thus becomes:

$$L = \begin{cases} (y_B - y_A) * TAB\left[\text{abs}(x_B - x_A)/Q\right] & \text{if } x_B - x_A \geq 0 \\ -1 * (y_B - y_A) * TAB\left[\text{abs}(x_B - x_A)/Q\right] & \text{otherwise} \end{cases}$$

Q controls the quantization and thus the number of elements in the table. Using Q=1 thus means no quantization. Also note that the looked-up index can be instead $(\text{abs}(x_B - x_A) + R)/Q$, typically with R=Q/2, or a variation thereof of the division rounding. Consequently, Q is ideally a power of 2 so that the division by $Q = 2^P$ is equivalent to a right-shift by P.

Finally, some of the values in that table may not be equal to 0: low values of $\text{abs}(x_B - x_A)$ or $\text{abs}(y_B - y_A)$ often result in very bad estimations of L. Pre-determined, or explicit (such as in the slice header or a parameter set such as PPS or SPS) values can be used then. For instance, for all values of D below 4, the array TAB may contains a default value, e.g. −(1>>S)/8.

For 10 bits content and Q=1, up to 2048 entries in the array are needed. By exploiting the symmetry with sign as shown above, this can be reduced to 1024. Increasing further Q would similarly reduce the size of TAB.

If some of the samples (either RecL or RecC, or both) are residual samples (i.e. resulting themselves from the difference between two blocks, possibly quantized), as it is the case in JVET with Cb to Cr prediction, then the table size (and content) can be accordingly adapted.

In another preferred embodiment, the determination of the two parameters of the straight line α and β in the following formula $\text{pred}_C(i,j) = \alpha \cdot \text{rec}_L{'}^{(i,j)} + \beta$ is computed so that integer arithmetic can be used to be easily implemented in hardware.

More precisely, the determination of the parameters α and β can be carried out only through integer multiplications and bit shift operations on integers. Such calculations utilize less hardware resource (e.g. memory and time) than other types of calculations such as floating-point arithmetic.

To perform this integer arithmetic, the following steps are performed.

A first intermediate value "pshift" is determined by taking into account the bit depth of the Luma and Chroma samples to be treated. This bit shift value ensures a specified maximum value of the denominator (referred to as 'cliff') of a. In the present embodiment, the maximum value of 'cliff' is 512, and as such can be represented in a table having 512 entries. By forcing a specific maximum value of 'cliff', a common table (or set of tables) can be used for a variety of different bitdepths which reduces the total memory requirements.

The value of pshift thus depends on the bitdepth of the samples—as (for example if the samples are encoded using 10 bits, the maximum difference between the maximum and minimum is 1024. In order to represent this in a table of 512 entries, it must be divided by 2 or bitshifted by 1 bit, so pshift=1. A relationship between pshift and bitdepth can, for example, be extracted for the following Table 1, or given by the following expression:

$$p\text{Shift} = (\text{BitDepth} > 9)? \text{BitDepth} - 9 : 0$$

This can alternatively be represented by the following expression:

$$p\text{Shift} = \begin{cases} \text{BitDepth} - 9, & \text{if BitDepth} > 9 \\ 0, & \text{otherwise} \end{cases}$$

An optional rounding value "add" may also be computed so as to make 'diff' an integer following the bit shifting. The 'add' value is related to pshift according to the following expression:

$$\text{add} = p\text{shift}? 1 >> (p\text{shift} - 1) : 0.$$

This can alternatively be represented by the following expression:

$$\text{add} = \begin{cases} 2^{(p\text{shift}-1)}, & \text{if } p\text{shift} > 0 \\ 0, & \text{otherwise} \end{cases}$$

Alternatively, a direct relationship between 'BitDepth' and 'add' can be provided by the following expressions:

$$\text{add} = (\text{BitDepth} > 9)? 1 >> (\text{BitDepth} - 10) : 0$$

Or:

$$\text{add} = \begin{cases} 2^{(Bitaepth-10)} & \text{if } Bitdepth > 9 \\ 0 & \text{otherwise} \end{cases}$$

Table 1 below gives example values of "pshift" and "add" corresponding to the Bit-depth of the Luma and Chroma samples to be treated varying from 8 to 16 bits.

TABLE 1

Example of "pshift" and "add" value

| Bit-depth | Value of "pShift" | Value of "add" |
|---|---|---|
| 8 or 9 bits | 0 | 0 |
| 10 bits | 1 | 1 |
| 11 bits | 2 | 2 |
| 12 bits | 3 | 4 |
| 13 bits | 4 | 8 |
| 14 bits | 5 | 16 |
| 15 bits | 6 | 32 |
| 16 bits | 7 | 64 |

This table may be stored in memory so as to avoid the need to recalculate 'pshift' and 'add' which may reduce the number of processing operations. However, certain implementations may prioritize the reduction of memory use over the number of processing operations and as such 'pshift' and 'add' may be calculated each time.

Then a "diff" value represents the range value between the minimum and the maximum values of the Luma samples in a manner suitable for processing using integer arithmetic. The value of 'cliff' is an integer which is constrained within a certain range by the use of 'pshift'. This value "diff" is computed from the following formula:

$$\text{diff}=(x_B-x_A+\text{add})>>p\text{shift}$$

Then the $\alpha$ and $\beta$ parameters are computed—it should be recalled that $\alpha$ and $\beta$ define the slope and intercept of the linear model intercepting points A and B:

$$a = \frac{y_B - y_A}{x_B - x_A}$$

$$\beta = y_A - \alpha x_A$$

If the value "diff" representing is equal to zero, then the $\alpha$ and $\beta$ parameter are assigned as follows:

$$\alpha = 0$$

$$\beta = y_A (\text{or } \beta = y_B)$$

The choice of using point A or B may be determined by which point is currently stored in memory so as to reduce the number of processing operations.

Otherwise, if the value "diff" is strictly positive, the value of a is determined by the following formula $$\alpha=(((y_B-y_A)*\text{Floor}(2^k/\text{diff})+\text{div}+\text{add})>>p\text{shift}) \quad (1)$$

where the function Floor(x) provides the greatest integer value less than or equal to x
and where the intermediate parameter "div" is computed as follows:

$$\text{div}=((y_B-y_A)*(\text{Floor}((2^k*2^k)/\text{diff})-\text{Floor}(2^k/\text{diff})*2^k)+2^{(k-1)})>>k \quad (2)$$

The accuracy of this division is represented by the variable "k". A value of k=16 has been found to provide the best coding efficiency, and allows for an accurate representation of $\alpha$ and $\beta$ using integer arithmetic. This will then enable a precise prediction of the Chroma sample when using the corresponding Luma sample.

As will be described in more detail below, the value of k also defines how much memory each entry requires. A value of k=16 allows for a 16 bit memory register that can be represented in 2 bytes to be used when addressing each of the entries in the table.

The parameter $\beta$ is determined by applying the straight-line equation on a single point of the straight line that could be either the point A $$\beta = y_A - ((1*x_A)>>k),$$

or the point B $$\beta = y_B - ((1*x_B)>>k).$$

The choice of using point A or B may be determined by which point is currently stored in memory so as to reduce the number of processing operations. Alternatively, it could be a fixed choice—for example defined in a standard.

From an implementation point of view in hardware, some of the terms in formulae (1) and (2) could be replaced with tables in which precomputed values are stored. The main advantage of such tables is to avoid computing the intermediate "Floor" function each time the derivation of the $\alpha$ and $\beta$ parameters is performed. In such a way, multiple processing operations may be replaced by a look-up operation.

For example, equation (1) can be simplified as follows to provide the equation (3) by using a table TAB1[diff]:

$$\alpha=(((y_B-y_A)*\text{TAB1}[\text{diff}]+\text{div}+\text{add})>>p\text{shift}) \quad (3)$$

where TAB1[diff]=Floor($2^k$/diff).

Similarly equation (2) can be simplified by using predetermined tables TAB1[diff] and TAB2[diff] to avoid to iterate the same operations.

$$\text{div}=((y_B-y_A)*(\text{TAB2}[\text{diff}]-\text{TAB1}[\text{diff}]*2^k)+2^{(k-1)})>>k \quad (4)$$

where TAB2[diff]=Floor(($2^k*2^k$)/diff).

This equation (4) could be further simplified by the following equation:

$$\text{div}=((y_B-y_A)*(\text{TAB3}[\text{diff}])+2^{(k-1)})>>k \quad (5)$$

where

TAB3[diff]=TAB2[diff]−TAB1[diff]*$2^k$=Floor(($2^k*2^k$)/diff)−$2^k$*Floor($2^k$/diff).

TAB1 and TAB3 (and also TAB2) are tables each having N entries N=$2^{(BitDepth-pshift)}$, and each entry being represented by k bits.

According to the definition of the integer variable "diff" above, and taking, for example, a Luma or a Chroma sample value represented on 10 bits, the maximum "diff" value is 512 (using Table 1 a above). This means that the table TAB1 and TAB3 (and also TAB2) can be, for each of them, represented by an array with 512 entries and each entry is coded on "k=16" bits. The "pshift" variable given in Table 1 enables to obtain same number of entries (here 512) according to the bit depth of the samples to be processed.

As mentioned previously, these arrays (TAB1 to TAB3) can be stored in memory to reduce the number of operations to be carried out for the derivation of the parameter $\alpha$ and $\beta$ in the equation (1) and (2).

In the scope of the VVC standardization work, such method can be used to implement the division to retrieve the $\alpha$ and $\beta$ parameters of the linear model to predict a Chroma sample from a Luma sample However, it has been surprisingly found that size of the table and the representation of each entry can be reduced without adversely impacting the coding efficiency.

As discussed above, the total memory required to store each table depends of the value of the "pshift" value and the number of bits to represent each entry can be coded by using the "k" value. In the embodiment discussed above, two tables (TAB1 and TAB3) are used, and each table has 512 entries and k=16. The memory needed to represent these two tables TAB1 and TAB3 is: 2*512*16=16 384 bits which can be stored on 2048 bytes.

Modifying the parameters which determine the memory requirements (both independently and jointly) will now be discussed.

Number of Entries in Each Table (Array)

Despite good compression being reached by using table having a size of 512 entries, these tables can be considered as quite large and it is desirable for their size to be reduced.

Tables 3 and 4 show the coding efficiency impact according to the Bjontegard metrics (see, for example Bjontegard. Calculation of average PSNR differences between rd-curves. Doc. VCEG-M33 ITU-T Q6/16, April 2001. 79 Z. Xiong, A. Liveris, and S. Cheng for an explanation of how these metrics are determined) by reducing the number of entry from 512 to 256 and 128 entries respectively. The decrease in the size of the table is performed by incrementing the value of 'pshift' by one (N=2(BitDetpth−pshift)). The value of 'add' may be adjusted accordingly. Altering N to 256 or 128 is shown in Table 2 below:

TABLE 2

Example of "pshift" and "add" value for a table of 256 or 128 entries

| | 256 entries | | 128 entries | |
|---|---|---|---|---|
| Bit-depth | Value of "pShift" | Value of "add" | Value of "pShift" | Value of "add" |
| 7 or below | 0 | 0 | 0 | 0 |
| 8 bits | 0 | 0 | 1 | 1 |
| 9 bits | 1 | 1 | 2 | 2 |
| 10 bits | 2 | 2 | 3 | 4 |
| 11 bits | 3 | 4 | 4 | 8 |
| 12 bits | 4 | 8 | 5 | 16 |
| 13 bits | 5 | 16 | 6 | 32 |
| 14 bits | 6 | 32 | 7 | 64 |
| 15 bits | 7 | 64 | 8 | 128 |
| 16 bits | 8 | 128 | 9 | 256 |

This table can be represented by the following expressions:

265 entries pShift=(BitDepth>8)? BitDepth−8:0

This can alternatively be represented by the following expression:

$$pShift = \begin{cases} BitDepth - 8, & \text{if } BitDepth > 8 \\ 0, & \text{otherwise} \end{cases}$$

An optional rounding value "add" may also be computed so as to make 'cliff' an integer following the bit shifting. The 'add' value is related to pshift according to the following expression:

add=pshift? 1>>(pshift−1):0.

This can alternatively be represented by the following expression:

$$add = \begin{cases} 2^{(pshift-1)}, & \text{if } pshift > 0 \\ 0, & \text{otherwise} \end{cases}$$

Alternatively, a direct relationship between 'BitDepth' and 'add' can be provided by the following expressions:

add=(BitDepth>8)? 1>>(BitDepth−9):0

Or:

$$add = \begin{cases} 2^{(Bitdepth-9)} & \text{if } Bitdepth > 8 \\ 0 & \text{otherwise} \end{cases}$$

128 Entries pShift=(BitDepth>7)? BitDepth−7:0

This can alternatively be represented by the following expression:

$$pShift = \begin{cases} BitDepth - 7, & \text{if } BitDepth > 7 \\ 0, & \text{otherwise} \end{cases}$$

An optional rounding value "add" may also be computed so as to make 'cliff' an integer following the bit shifting. The 'add' value is related to pshift according to the following expression:

add=pshift? 1>>(pshift−1):0.

This can alternatively be represented by the following expression:

$$add = \begin{cases} 2^{(pshift-1)}, & \text{if } pshift > 0 \\ 0, & \text{otherwise} \end{cases}$$

Alternatively, a direct relationship between 'BitDepth' and 'add' can be provided by the following expressions:

add=(BitDepth>7)? 1>>(BitDepth−8):0

Or:

$$add = \begin{cases} 2^{(Bitdepth-8)} & \text{if } Bitdepth > 7 \\ 0 & \text{otherwise} \end{cases}$$

The reduction of the size of the table results in a coarser representation of the difference between the maximum and the minimum value of the sample values.

The coding efficiency evaluation test has been performed on a set of video sequences used by the JVET standardization committee defined in the document JVET-L1010. In the Table below, negative values show better coding efficiency while positive values correspond to a decrease in coding efficiency.

TABLE 3

Compression performance when using tables of size 256

All Intra Main10

|  | Y | U | V |
|---|---|---|---|
| Class A1 | −0.03% | 0.11% | 0.10% |
| Class A2 | 0.00% | −0.02% | −0.02% |
| Class B | 0.02% | 0.01% | 0.01% |
| Class C | 0.03% | 0.00% | 0.00% |
| Class D | 0.08% | −0.46% | −0.46% |
| Class E | 0.01% | 0.16% | 0.16% |
| Overall | 0.01% | 0.04% | 0.13% |

As is shown in Table 3, the coding efficiency is surprisingly essentially unaffected, despite the number of entry in the table TAB1 and TAB3 having been reduced by a factor of 2. We can observe that the losses, introduced by the modification affecting the CCLM mode, are very limited and they are less than 0.2% in the Chroma channels (U) and (V) which is essentially negligible (and most likely representing noise).

A similar experiment for a table size of 128—generated by incrementing the value of pshift by an additional 1 (as shown in table 2 above) was conducted.

TABLE 4

Compression performance when using tables of size 128

All Intra Main10
K16S128

|  | Y | U | V |
|---|---|---|---|
| Class A1 | 0.03% | 0.15% | 0.08% |
| Class A2 | 0.02% | 0.04% | 0.04% |
| Class B | 0.02% | −0.13% | −0.13% |
| Class C | 0.03% | 0.06% | 0.06% |
| Class D | −0.01% | −0.19% | −0.19% |
| Class E | −0.01% | −0.06% | −0.06% |
| Overall | 0.02% | 0.00% | 0.03% |

As is shown in Table 4, even more surprisingly, the coding efficiency is still essentially unaffected, despite the number of entry in the table TAB1 and TAB3 having been reduced by a factor of 4. We can observe that the losses, introduced by the modification affecting the CCLM mode, are very limited and they are less than 0.05% in the Chroma channels (U) and (V) which is essentially negligible (and most likely representing noise).

However, a further reduction of the size of the table to 64 entries (by incrementing pshift by an additional 1) results in a larger loss of compression performance as presented in table 5 below:

All Intra Main10
K16S64

|  | Y | U | V |
|---|---|---|---|
| Class A1 | 0.14% | 0.39% | 0.36% |
| Class B | 0.00% | 0.10% | 0.10% |
| Class C | −0.02% | 0.07% | 0.07% |
| Class D | 0.04% | −0.16% | −0.16% |
| Class E | 0.04% | 0.07% | 0.07% |

These results are partial as they do not include Class A2, and as such no 'overall' figure.

The results presented above show that the size of the tables can be reduced by a factor of 2 or even 4, without adversely affecting the efficiency of the CCLM mode where the parameters α and β are derived using the two points A and B.

In another embodiment, the number of entries in the table (i.e. value of pshift) may vary depending on bit depth (e.g. 128 (or 256) for up to 10 bits and 256 (or 512) for over 10 bits). This may be due to the fact that a more powerful encoder would be required to encode samples represented by (for example) 16 bits—and as such the complexity of calculation using a larger table would not present as large an issue. In such a case, a marginal increase in encoding performance by using a larger number (e.g. 512 or more) entries may be prioritized.

Number of Bits Representing Each Entry in the Tables (Arrays)

To further reduce the size of the table, each entry within the table can be also represented on less than the initial k=16 bits which uses 2 bytes per entry. Reducing the value of k represents decreasing the accuracy of the division as it essentially corresponds to reducing the magnitude to represent a with integers. Tables 6 below show the impact of the coding efficiency when decreasing the number of bits to represent each entry (compared to k=16).

TABLE 6

Coding performance when reducing the k value.

All Intra Main10

| | k = 14 | | | k = 12 | | |
|---|---|---|---|---|---|---|
| | Y | U | V | Y | U | V |
| Class A1 | −0.02% | 0.15% | 0.08% | −0.02% | 0.15% | 0.08% |
| Class A2 | 0.00% | 0.02% | 0.02% | 0.00% | 0.02% | 0.02% |
| Class B | 0.01% | −0.18% | −0.18% | 0.01% | −0.18% | −0.18% |
| Class C | −0.02% | 0.01% | 0.01% | −0.02% | 0.01% | 0.01% |
| Class D | 0.02% | −0.24% | −0.24% | 0.02% | −0.24% | −0.24% |
| Class E | 0.04% | −0.14% | −0.14% | 0.04% | −0.14% | −0.14% |
| Overall | 0.00% | −0.04% | 0.05% | 0.00% | −0.04% | 0.05% |

| | k = 10 | | | k = 8 | | |
|---|---|---|---|---|---|---|
| | Y | U | V | Y | U | V |
| Class A1 | −0.02% | 0.11% | 0.08% | 0.02% | 0.25% | 0.05% |
| Class A2 | 0.01% | −0.10% | −0.10% | 0.02% | −0.02% | −0.02% |

TABLE 6-continued

Coding performance when reducing the k value.

| Class | | | | | | |
|---|---|---|---|---|---|---|
| Class B | 0.00% | −0.03% | −0.03% | 0.03% | 0.04% | 0.04% |
| Class C | −0.03% | 0.15% | 0.15% | 0.00% | −0.16% | −0.16% |
| Class D | 0.04% | −0.54% | −0.54% | 0.07% | 0.08% | 0.08% |
| Class E | 0.02% | 0.06% | 0.06% | 0.01% | −0.20% | −0.20% |
| Overall | 0.00% | 0.04% | 0.16% | 0.01% | −0.02% | 0.07% |

| | k = 7 | | | k = 6 | | |
|---|---|---|---|---|---|---|
| | Y | U | V | Y | U | V |
| Class A1 | 0.02% | 0.33% | 0.05% | 0.05% | 0.80% | 0.31% |
| Class A2 | 0.02% | 0.07% | 0.07% | 0.03% | 0.21% | 0.21% |
| Class B | 0.03% | −0.09% | −0.09% | 0.05% | 0.03% | 0.03% |
| Class C | −0.03% | 0.09% | 0.09% | 0.00% | 0.22% | 0.22% |
| Class D | 0.01% | 0.05% | 0.05% | −0.01% | −0.04% | −0.04% |
| Class E | 0.01% | 0.09% | 0.09% | 0.02% | 0.31% | 0.31% |
| Overall | 0.01% | 0.08% | 0.07% | 0.03% | 0.28% | 0.28% |

| | k = 5 | | | k = 4 | | |
|---|---|---|---|---|---|---|
| | Y | U | V | Y | U | V |
| Class A1 | 0.30% | 2.13% | 1.04% | 0.89% | 6.18% | 3.31% |
| Class A2 | 0.09% | 0.83% | 0.83% | 0.30% | 2.73% | 2.73% |
| Class B | 0.11% | 0.31% | 0.31% | 0.33% | 1.60% | 1.60% |
| Class C | 0.08% | 0.75% | 0.75% | 0.40% | 2.78% | 2.78% |
| Class D | 0.07% | −0.10% | −0.10% | 0.26% | 1.49% | 1.49% |
| Class E | 0.07% | 0.50% | 0.50% | 0.15% | 1.83% | 1.83% |
| Overall | 0.13% | 0.83% | 0.70% | 0.40% | 2.85% | 2.47% |

| | k = 3 | | |
|---|---|---|---|
| | Y | U | V |
| Class A1 | 2.46% | 17.76% | 10.99% |
| Class A2 | 1.06% | 8.33% | 8.33% |
| Class B | 0.78% | 6.86% | 6.86% |
| Class C | 1.27% | 9.95% | 9.95% |
| Class D | 0.72% | 5.90% | 5.90% |
| Class E | 0.33% | 3.66% | 3.66% |
| Overall | 1.14% | 9.07% | 8.35% |

These above Tables 6 show the surprising result that when the entries are represented on 8 bits or fewer, the coding efficiency is essentially the same as compared to k=16 bits.

The above tables show acceptable coding efficiency results are obtained for k which is comprised in the interval of 6 to 8. A similar result is achieved for k is in the interval 9-15, but such a representation would still require 2 bytes so would not provide as great an advantage in reducing the memory required to store the table.

Tables 6 show that for k equal to 5 bits or fewer, a larger degradation is observed due to the division when calculating alpha becoming inaccurate.

It has thus been surprisingly found that the best compromise between performance and storage is where k=8 bits.

Compared to a k=16 bits, where each entry is represented on 2 bytes, this present embodiment can only use a single byte to represent an entry of the table TAB1 or TAB3. This decreases the complexity of all computations involving k, and as such reduces processing demand.

A value of k=6, 7 or 8 surprisingly provides similar coding performance to k=16, with higher values of k providing marginally better coding performance.

Particularly surprisingly, it is possible to decrease k by an entire byte (8 bits) without seeing any appreciable decrease in coding performance.

Furthermore, it is surprising to find that k can be reduced to as low as k=6, and only beyond this is an appreciable decrease in coding performance detected.

By reducing k from 16 to 8, the total memory used for each table is reduced by a factor of 2.

This is surprising as typically the accuracy of operations involving bit-shifts are strongly affected by small changes to the value of the bit-shift parameter, and a large degradation in coding performance would be expected when decreasing the value of k by even a small amount. However, the above results show, counterintuitively, that a large change in the value of k (e.g. from 16 down to 6) only decreases the coding performance by a negligible amount (<0.14%).

The choice of k may vary depending on bit depth (e.g. 8 for up to 10 bits and 16 for over 10 bits). This may be due to the fact that a more powerful encoder would be required to encode samples represented by (for example) 16 bits—and as such the complexity of calculation using a larger table would not present as large an issue. In such a case, a marginal increase in encoding performance by using a larger number (e.g. more than 8) of bits may be prioritized.

Combination of Number of Entries and Number of Bits Representing Each Entry

Table 7 below show results for coding performance for varying k from 8 to 5 when there are 256 entries in each table (i.e. a combination of the two sets of results presented in tables 3 and 6 above)—compared to a baseline of k=16 and 512 entries in each table.

TABLE 7

Coding performance when reducing the k value and the number of entries from 512 to 256

| | All Intra Main10 | | | | | |
|---|---|---|---|---|---|---|
| | k = 16 | | | k = 14 | | |
| | Y | U | V | Y | U | V |
| Class A1 | −0.03% | 0.11% | 0.10% | 0.01% | 0.23% | 0.16% |
| Class A2 | 0.00% | −0.02% | −0.02% | −0.02% | 0.08% | 0.08% |
| Class B | 0.02% | 0.01% | 0.01% | 0.01% | 0.04% | 0.04% |
| Class C | 0.03% | 0.00% | 0.00% | −0.02% | 0.18% | 0.18% |
| Class D | 0.08% | −0.46% | −0.46% | 0.00% | −0.23% | −0.23% |
| Class E | 0.01% | 0.16% | 0.16% | 0.00% | 0.04% | 0.04% |
| Overall | 0.01% | 0.04% | 0.13% | 0.00% | 0.11% | 0.11% |
| | k = 12 | | | k = 10 | | |
| | Y | U | V | Y | U | V |
| Class A1 | −0.01% | 0.13% | −0.02% | −0.04% | −0.02% | 0.08% |
| Class A2 | 0.01% | −0.13% | −0.13% | 0.03% | −0.12% | −0.12% |
| Class B | −0.01% | 0.08% | 0.08% | −0.01% | 0.01% | 0.01% |
| Class C | −0.03% | 0.15% | 0.15% | −0.02% | −0.01% | −0.01% |
| Class D | 0.04% | −0.13% | −0.13% | 0.03% | 0.01% | 0.01% |
| Class E | −0.04% | 0.11% | 0.11% | 0.00% | −0.24% | −0.24% |
| Overall | −0.01% | 0.07% | 0.13% | −0.01% | −0.06% | 0.20% |
| | k = 8 | | | k = 7 | | |
| | Y | U | V | Y | U | V |
| Class A1 | 0.00% | 0.02% | −0.06% | 0.01% | 0.11% | 0.01% |
| Class A2 | 0.02% | −0.05% | −0.05% | 0.02% | −0.01% | −0.01% |
| Class B | 0.03% | −0.04% | −0.04% | 0.01% | −0.03% | −0.03% |
| Class C | 0.00% | 0.13% | 0.13% | 0.01% | −0.12% | −0.12% |
| Class D | 0.01% | −0.12% | −0.12% | 0.02% | 0.04% | 0.04% |
| Class E | 0.00% | 0.06% | 0.06% | −0.03% | 0.37% | 0.37% |
| Overall | 0.01% | 0.02% | 0.10% | 0.01% | 0.04% | 0.03% |
| | k = 6 | | | k = 5 | | |
| | Y | U | V | Y | U | V |
| Class A1 | 0.03% | 0.23% | 0.08% | 0.12% | 0.80% | 0.43% |
| Class A2 | 0.02% | 0.02% | 0.02% | 0.06% | 0.24% | 0.24% |
| Class B | 0.03% | −0.06% | −0.06% | 0.06% | 0.00% | 0.00% |
| Class C | 0.01% | 0.17% | 0.17% | 0.02% | 0.10% | 0.10% |
| Class D | 0.06% | −0.23% | −0.23% | 0.06% | 0.06% | 0.06% |
| Class E | −0.01% | 0.17% | 0.17% | 0.01% | 0.20% | 0.20% |
| Overall | 0.02% | 0.09% | 0.14% | 0.05% | 0.23% | 0.26% |
| | k = 4 | | | k = 3 | | |
| | Y | U | V | Y | U | V |
| Class A1 | 0.46% | 2.62% | 1.67% | 1.36% | 8.47% | 5.60% |
| Class A2 | 0.16% | 1.33% | 1.33% | 0.52% | 4.45% | 4.45% |
| Class B | 0.17% | 0.74% | 0.74% | 0.54% | 3.53% | 3.53% |
| Class C | 0.18% | 1.05% | 1.05% | 0.76% | 5.21% | 5.21% |
| Class D | 0.16% | 0.96% | 0.96% | 0.49% | 3.29% | 3.29% |
| Class E | 0.13% | 1.13% | 1.13% | 0.24% | 2.85% | 2.85% |
| Overall | 0.21% | 1.29% | 1.21% | 0.67% | 4.77% | 4.60% |

The above coding efficiency results show the surprising result that by using two tables (TAB1 and TAB3) having 256 entries encoded using a single byte each (i.e. k≤8) similar results can be obtained compared to the case of two tables with 512 entries represented on 2 bytes. A particular advantage of this embodiment is the reduction by a factor of 4 of the memory needed to store these tables TAB1 and TAB3 without impacting the coding efficiency result. In this particular embodiment, the memory needed to represent the two tables (TAB1 and TAB3) is: 2*256*8=4 092 bits, which can be stored on 512 bytes.

Table 8 below show results for coding performance for varying k from 8 to 5 when there are 128 entries in each table (i.e. a combination of the two sets of results presented in tables 4 and 6 above)—compared to a baseline of k=16 and 512 entries in each table.

TABLE 8

Coding performance when reducing the k value and the number of entries from 512 to 128

| | All Intra Main10 | | | | | |
|---|---|---|---|---|---|---|
| | k = 16 | | | k = 14 | | |
| | Y | U | V | Y | U | V |
| Class A1 | 0.03% | 0.15% | 0.08% | 0.01% | 0.25% | 0.15% |
| Class A2 | 0.02% | 0.04% | 0.04% | 0.02% | 0.04% | −0.04% |
| Class B | 0.02% | −0.13% | −0.13% | 0.01% | −0.12% | −0.12% |
| Class C | 0.03% | 0.06% | 0.06% | −0.03% | 0.22% | 0.22% |
| Class D | −0.01% | −0.19% | −0.19% | 0.05% | 0.02% | 0.02% |
| Class E | −0.01% | −0.06% | −0.06% | −0.01% | 0.04% | 0.04% |
| Overall | 0.02% | 0.00% | 0.03% | 0.00% | 0.06% | 0.16% |
| | k = 12 | | | k = 10 | | |
| | Y | U | V | Y | U | V |
| Class A1 | 0.05% | −0.04% | −0.06% | 0.00% | 0.05% | 0.20% |
| Class A2 | 0.01% | 0.01% | 0.01% | 0.02% | −0.17% | −0.17% |
| Class B | 0.00% | 0.15% | 0.15% | 0.02% | −0.06% | −0.06% |
| Class C | −0.02% | 0.11% | 0.11% | 0.00% | 0.02% | 0.02% |
| Class D | 0.10% | −0.58% | −0.58% | 0.05% | −0.29% | −0.29% |
| Class E | −0.04% | 0.07% | 0.07% | 0.01% | −0.05% | −0.05% |
| Overall | 0.00% | 0.07% | 0.09% | 0.01% | −0.04% | 0.13% |
| | k = 8 | | | k = 7 | | |
| | Y | U | V | Y | U | V |
| Class A1 | 0.03% | 0.02% | 0.04% | 0.02% | 0.07% | 0.01% |
| Class A2 | 0.01% | −0.13% | −0.13% | 0.01% | −0.01% | −0.01% |
| Class B | 0.01% | −0.09% | −0.09% | 0.01% | 0.02% | 0.02% |
| Class C | 0.01% | −0.17% | −0.17% | −0.01% | 0.11% | 0.11% |
| Class D | 0.01% | −0.25% | −0.25% | 0.01% | 0.08% | 0.08% |
| Class E | 0.00% | −0.20% | −0.20% | 0.00% | −0.09% | −0.09% |
| Overall | 0.01% | −0.11% | 0.09% | 0.01% | 0.03% | 0.06% |
| | k = 6 | | | k = 5 | | |
| | Y | U | V | Y | U | V |
| Class A1 | 0.04% | 0.27% | 0.17% | 0.10% | 0.35% | 0.34% |
| Class A2 | 0.04% | −0.07% | −0.07% | 0.03% | 0.12% | 0.12% |
| Class B | 0.02% | −0.02% | −0.02% | 0.04% | −0.03% | −0.03% |
| Class C | 0.01% | 0.19% | 0.19% | 0.03% | 0.20% | 0.20% |
| Class D | 0.07% | 0.22% | 0.22% | 0.03% | −0.04% | −0.04% |
| Class E | 0.03% | −0.04% | −0.04% | −0.01% | 0.14% | 0.14% |
| Overall | 0.03% | 0.06% | 0.17% | 0.04% | 0.14% | 0.21% |
| | k = 4 | | | k = 3 | | |
| | Y | U | V | Y | U | V |
| Class A1 | 0.27% | 1.41% | 0.98% | 0.82% | 4.99% | 3.28% |
| Class A2 | 0.09% | 0.84% | 0.84% | 0.30% | 2.84% | 2.84% |
| Class B | 0.11% | 0.18% | 0.18% | 0.31% | 1.89% | 1.89% |
| Class C | 0.08% | 0.60% | 0.60% | 0.38% | 2.42% | 2.42% |
| Class D | 0.13% | 0.33% | 0.33% | 0.26% | 1.51% | 1.51% |
| Class E | 0.12% | 0.47% | 0.47% | 0.20% | 2.07% | 2.07% |
| Overall | 0.13% | 0.64% | 0.59% | 0.39% | 2.71% | 2.78% |

The above coding efficiency results show the surprising result that by using two tables (TAB1 and TAB3) having 128 entries encoded using a single byte each (i.e. k≤8) similar results can be obtained compared to the case of two tables with 512 entries represented on 2 bytes. It is particularly surprising that in a number of examples, using 128 entries actually improves coding performance compared to using 256 entries. For example, for k=8 (one byte per entry), the results show that a table size of 128 results in improved coding performance compared to a table of 256 entries.

A particular advantage of this embodiment is the reduction by a factor of 8 of the memory needed to store these tables TAB1 and TAB3 without impacting the coding efficiency result. In this particular embodiment, the memory needed to represent the two tables (TAB1 and TAB3) is: 2*128*8=2 046 bits, which can be stored on 256 bytes.

The CCLM mode can thus use this division method to retrieve the α and β parameters that can be implemented through integer arithmetic for efficient hardware implementation.

In particular, it has been shown that a combination of reducing the number of entries in the table as well as reducing the size of each entry does not result in an compounding of reduction in performance (as might be expected), rather, essentially the same performance is achieved when combining the reduction in number of entries in the table and reduction in the size of each entry compared to doing either independently.

For completeness, table 9 show partial results when a table of N=64 entries is used compared to a baseline of k=16 and N=512. It should be noted that the loss of performance is significant for class A1 (which is the main objective for VVC) in the U and V components:

TABLE 9

Partial coding performance results when reducing the k value and the number of entries from 512 to 64

All Intra Main10

| | k = 16 | | | k = 14 | | |
|---|---|---|---|---|---|---|
| | Y | U | V | Y | U | V |
| Class A1 | 0.14% | 0.39% | 0.36% | 0.11% | 0.52% | 0.49% |
| Class B | 0.00% | 0.10% | 0.10% | 0.02% | 0.11% | 0.11% |
| Class C | −0.02% | 0.07% | 0.07% | 0.03% | 0.08% | 0.08% |
| Class D | 0.04% | −0.16% | −0.16% | 0.05% | −0.57% | 0.57% |
| Class E | 0.04% | 0.07% | 0.07% | 0.04% | −0.19% | −0.19% |

| | k = 12 | | | k = 10 | | |
|---|---|---|---|---|---|---|
| | Y | U | V | Y | U | V |
| Class A1 | 0.13% | 0.49% | 0.56% | 0.11% | 0.39% | 0.33% |
| Class B | 0.04% | 0.09% | 0.09% | 0.02% | −0.06% | −0.06% |
| Class C | 0.00% | −0.04% | −0.04% | −0.04% | 0.19% | 0.19% |
| Class D | −0.01% | 0.07% | 0.07% | 0.03% | −0.32% | −0.32% |
| Class E | 0.01% | −0.14% | −0.14% | 0.04% | −0.08% | −0.08% |

| | k = 8 | | | k = 7 | | |
|---|---|---|---|---|---|---|
| | Y | U | V | Y | U | V |
| Class A1 | 0.10% | 0.43% | 0.34% | 0.14% | 0.57% | 0.42% |
| Class B | 0.03% | 0.04% | 0.04% | 0.00% | −0.02% | 0.02% |
| Class C | −0.05% | 0.27% | 0.27% | −0.04% | 0.19% | 0.19% |
| Class D | 0.07% | −0.64% | −0.64% | −0.04% | 0.10% | 0.10% |
| Class E | 0.06% | −0.37% | −0.37% | 0.03% | 0.22% | 0.22% |

| | k = 6 | | | k = 5 | | |
|---|---|---|---|---|---|---|
| | Y | U | V | Y | U | V |
| Class A1 | 0.13% | 0.39% | 0.56% | 0.14% | 0.74% | 0.35% |
| Class B | 0.04% | 0.10% | 0.10% | 0.03% | −0.04% | −0.04% |
| Class C | 0.00% | 0.05% | 0.05% | 0.00% | 0.08% | 0.08% |
| Class D | 0.01% | −0.14% | −0.14% | 0.03% | −0.01% | −0.01% |
| Class E | 0.05% | −0.05% | −0.05% | 0.07% | 0.15% | 0.15% |

| | k = 4 | | | k = 3 | | |
|---|---|---|---|---|---|---|
| | Y | U | V | Y | U | V |
| Class A1 | 0.29% | 1.20% | 0.87% | 0.63% | 4.01% | 2.39% |
| Class B | 0.03% | 0.22% | 0.22% | 0.23% | 1.43% | 1.43% |
| Class C | 0.04% | 0.19% | 0.19% | 0.25% | 1.39% | 1.39% |
| Class D | 0.18% | −0.40% | −0.40% | 0.18% | 1.50% | 1.50% |
| Class E | 0.06% | 0.70% | 0.70% | 0.16% | 1.66% | 1.66% |

Representation of α

In another embodiment, the value of the a parameter is modified so that it can be represented on "L" bits. With the derivation process of α and β described above, the value of a could reach up to 17 bits when k is equal to 8 (and up to 25 bits if k=16). A primary reason to modify the value of a is to limit the bit width of the multiplication in the prediction formula below:

$$Cc = ((\alpha * L_c) >> k) + \beta$$

where Cc is the Chroma predicted value corresponding to the Luma Lc value, and α and β are the parameters of the slope (which may be derived as described above).

If the luma samples are coded on 10 bits it means that the core loop of prediction is required to be able to handle multiplication of up to 10 bits by 17 bits which is computationally complex (and may utilize large amounts of memory). In this embodiment, the value of a is modified so that the multiplication does not exceed 16 bits. Such a calculation is well suited to hardware implementation—for example, a 16-bit processor can undertake the calculation using a single memory register.

In order to achieve this, a needs to be represented by 6 bits or fewer. To reach this 6-bit representation, the range of a may be 'clipped' so that larger values are forced into a specified range.

In another embodiment, the magnitude of is a determined so that it is reduced, by dividing it by an appropriate amount, and adjusting the shift parameter k accordingly. Determining the amount of the adjustment to the shift value (k) comprises finding the "most significant bit" position P (a classical operation, performed by counting e.g. the leading 0s or taking the base-2 logarithm). In this case, if it is above a limit L (5 or 6 in the preferred embodiment), the following operations are performed:

$$\alpha = \alpha >> (P-L)$$

$$k = k + L - P$$

i.e. $\alpha$ is divided by a factor $2^{(P-L)}$ and the value of k is compensated by an opposite amount (L–P).

The value of L may depend on bitdepth, but can be the same for several bitdepths to simplify implementations. Additionally, L may take into account the sign bit, i.e. L=5.

It was also observed that in most implementation cases, the floating point value of $\alpha$ is within in the range [−2.0; 2.0] in the CCLM mode. The usage of only 6 bits could, for example, represent 64 values in the interval [−2.0; 2.0] with any calculated values falling outside this range being replaced by end-point of the range.

In any case, the clipping of $\alpha$ into any range may be performed prior to reducing its magnitude. This ensures that outlying values are removed prior to undertaking the magnitude reduction processing.

Figure 11:
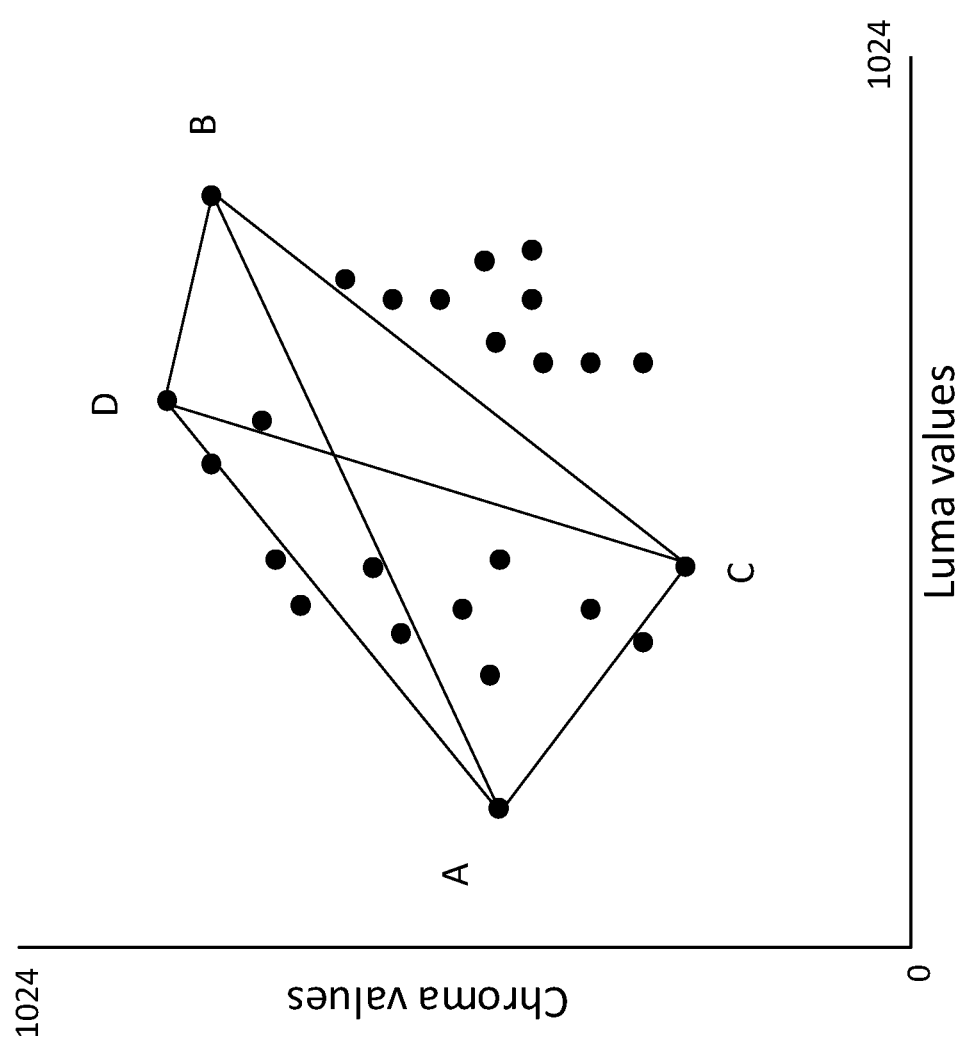
FIG. 11 illustrates several points of luma and chroma neighboring samples and segments used to determine best two points in some embodiments of the invention.

FIG. 11 illustrates different ways of selecting two points (A and B) in embodiments of the invention.

The proposed simplification of the derivation has an impact on coding efficiency. To reduce this coding efficiency loss the careful selection of the two points is a very important step.

In the first embodiment as described previously, the minimum and the maximum of the neighboring luma sample values are selected corresponding to points A and B of FIG. 11.

In an alternative embodiment, the two selected points are points C and D of FIG. 11, which correspond to the pair of luma and chroma samples corresponding to the minimum and the maximum of the neighboring chroma sample values. This alternative embodiment is sometimes interesting in term of coding efficiency.

In an alternative embodiment, the longest segment between segments [AB] and [CD] is determined and if the [AB] segment is longer than the [CD] segment, points A and B are selected, otherwise points C and D are selected. The length of each segment can be computed with a Euclidian distance. Yet, another distance measure can be used. This embodiment improves the coding efficiency compared to the two first ones. Indeed, when the two selected points are far, generally the generated linear model is relevant. Consequently, the generated chroma block predictor is relevant to predict the current block.

In an alternative embodiment, the longest segment among all possible segments that can be generated between A, B, C, D gives the two selected points. This corresponds to segments [AB], [CD], [AC], [AD], [CB] and [DB] as depicted in FIG. 11. This embodiment improves the coding efficiency compared to the previous ones at the price of a higher complexity.

In a preferred embodiment, the points representing the minimum and the maximum of the RecL' luma sample values are set so as to create the A and B points and if one component of point A is equal to its corresponding component from B ($x_B = x_A$ or $y_B = y_A$), the points representing the minimum and the maximum of the chroma sample values C and D are selected. This embodiment obtains the best coding efficiency because if $x_B = x_A$ or $y_B = y_A$ then $\alpha$ (or L) is respectively infinite or equal to 0 and consequently the chroma predictor block is respectively unusable or equivalent to the DC prediction. This is the case as soon as either the numerator or denominator of the fraction representative of $\alpha$ (or L) is too low (for example, it may be verified the following condition: $|\alpha|<0.1$): any error on it (such as due to quantization) even by a small amount lead to very different values of $\alpha$ (or L). In the remainder of the document, such cases, which are basically almost horizontal or vertical slopes, lead to what is referred to as an abnormal slope, whether it is $\alpha$ or L.

In an additional embodiment, several pairs of points, as all depicted in FIG. 11, are tested until $\alpha$ is not "abnormal". This embodiment improves the coding efficiency of the previous one but it increases the computational complexity.

In one alternative embodiment, the differences between the maximum and the minimum of the two components (chroma and luma) is computed. In addition, the component with the maximum difference is selected to determine the two points defining the line for the computation of the model parameters. This embodiment is efficient when the two components are the two chroma components or two RGB components.

The selection of the two points A and B may be done on values of samples of the current block. In one embodiment, the two points for the simplified linear model derivation are set based on the sample values of the current downsampled luma block (505 in FIG. 5). The luma samples values of the sample pairs in the neighborhood of the block are compared to the luma sample values of the luma block. The value with the maximum occurrence is selected to create $x_A$ and the second value with the maximum occurrence is selected to create $x_B$. The corresponding chroma values $y_A$ and $y_B$ are the average values of the collocated chroma samples in the sample pairs in the neighborhood of the block. When a (or L) is "abnormal" (equal to 0 or close to 0 ($|\alpha|<0.1$)), $x_B$ is one of the luma values with the less selection instead of the second most selected value. In the same way, y B are the average values of the collocated chroma samples. This embodiment increases the coding efficiency compared to previous embodiment at the price of a highest complexity.

The selection of the two points A and B may be done on spatial positions of sample pairs.

In previous embodiments it is needed to determine the minimum and the maximum values for luma (A, B) or/and for chroma (C, D) among M pairs of luma and chroma neighboring samples. This can be considered as an additional complexity. Therefore, for some implementations, it is preferable to obtain these two points with a minimum complexity.

In one embodiment, one linear model is generated with the chroma samples RecC (501 on FIG. 5) and with the downsampled luma samples of the border RecL' (503). The first point selected is the bottom sample of the left row, referenced 5004, of luma and the collocated chroma sample 5001. The second point selected is the top right luma sample 5003 and the co-located chroma sample 5002. This selection of the two points is very simple but it is also less efficient than previous embodiments based on values.

Additionally, if one of the top or left edge does not exist, for example for block on the border of an image or a slice or is unavailable, for example for complexity or error resilience reasons, then two samples (e.g. those whose luma is 504 or 5003 on the available edge) are selected instead of the missing one. It can thus be seen that several conditions exist to select the samples.

A further embodiment is described in which, if not enough points can be selected to compute the slope, or they result in an "abnormal" a (or L), then a default point can be selected instead. This embodiment can also be applied for MMLM mode with adaptation. To create the linear model parameters for the first group, the first point is the bottom sample of the second left row (5009) of luma and the collocated chroma sample (5005). Moreover, the second point is the up luma sample of the first left row (5010) and the collocated chroma sample (5006).

To create the linear model parameters for the second group, the first point is the left sample of the first up line (5011) of luma and the collocated chroma sample (5007). And the second point is the right luma sample of the second up line (5012) and the collocated chroma sample (5008).

This embodiment simplifies the selection of the four points for the first and the second group.

In yet another embodiment, the threshold of the MMLM mode is the luma value of points 5010 or 5011, namely the top right point of the left neighborhood and the bottom left point of the top neighborhood in the example, or an average between these points. This additional embodiment simplifies the computation of the threshold.

In yet a further embodiment to all these embodiments related to the selection of two points, the downsampling process of luma is disabled and it is replaced by a decimation, i.e. one in two luma samples is used for the RecL' samples. In this case, steps 1001 in FIG. 10 and 1201 in FIG. 12, which is described in detail below, would be skipped. This embodiment reduces the complexity with a minor impact on coding efficiency.

Points A, B, C and D are determined based on decoded versions of samples, and thus may not match the original samples values. This can cause abnormally short segments, or just noisy estimation, as already described when defining what is an "abnormal" slope. A and C being the two lowest points, and B and D being the two highest, instead of using any two of them, the point E defined as the average between A and C, and point F defined as the average between B and D can be used, at the cost of a few simple supplementary operations:

$$x_E = (x_A + x_C + 1) >> 1 \text{ and } y_E = (y_A + y_C + 1) >> 1$$

$$x_F = (x_B + x_D + 1) >> 1 \text{ and } y_F = (y_B + y_D + 1) >> 1$$

$$A = \frac{(y_E - y_F) \ll S}{x_E - x_F}$$

$$\beta = y_E - A \cdot (x_E >> S)$$

Obviously, if $y_E - y_F$ or $x_E - x_F$ equals 0 or is too low (i.e. the derived slope is "abnormal"), then points A, B, C and D are considered per the usual to obtain better parameters.

It should be understood from this that the two points used in the computation of the slope in the model may not be two actual points made from samples values of RecL' or RecC. This explains the use of the "determine" wording in step 1003 instead of "select".

Figure 12:
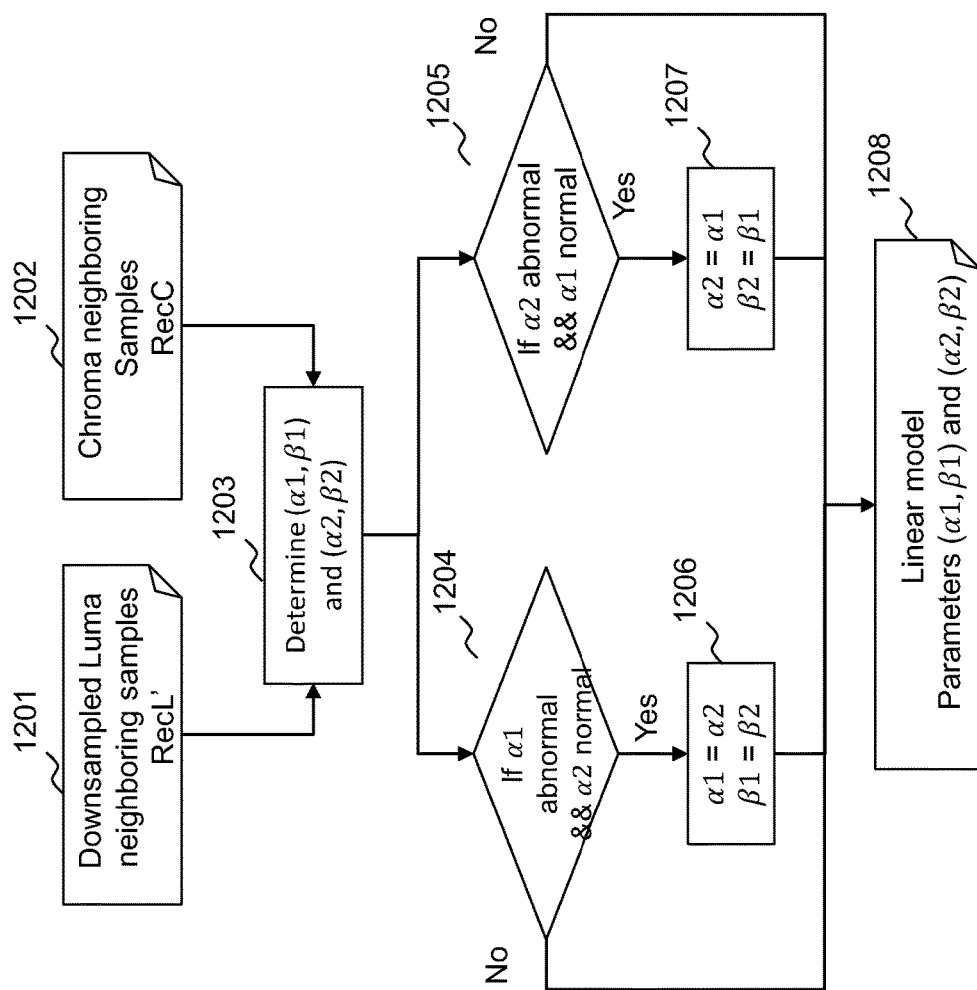
FIG. 12 illustrates the main steps of a process of a MMLM derivation in one embodiment of the invention.

In yet a further embodiment, for MMLM mode, if the α (or L) parameter defining the slope of one group is "abnormal", the corresponding LM parameters are set equal to the LM parameters of the other group or another group if more than two groups of LM parameters. FIG. 12 illustrates this embodiment. After the determination of (α1,β1) and (α2,β2) defining the two models for the two groups in step 1203, α1 and α2 are tested to check if they are equal to 0 in steps 1204 and 1205. If it is the case, the "abnormal" slope parameter a (or L) is set equal to the other slope parameter α, similarly, the corresponding β parameter value of the other group is also used in steps 1206 and 1207. So in that case, only one set of parameters is used whatever the value of the down-sampled luma sample values of the current block, there is no comparison to the threshold, the same complexity as the CCLM mode is obtained. The advantage of this embodiment is a coding efficiency improvement with a small complexity because no additional linear model parameters need to be derived.

In an alternative embodiment, when one slope parameter a (or L) is "abnormal", one set of linear parameters are re-derived by considering all initial samples of the MMLM (it corresponds to the CCLM derivation with two up lines and two neighboring rows, instead of one up line and one neighboring row). This embodiment gives better coding efficiency than the previous one, but it is more complex because it is needed to re-derive a set of linear model parameters.

The simplified LM derivation with two points as described in this document is generally less efficient than the classical LMS derivation except if it does not replace all LMS derivation when several LM modes are competing.

In one embodiment, the LM derivation with two points is used only for the CCLM mode to derive a chroma block predictor. This embodiment gives coding efficiency improvements.

In one embodiment, the derivation with two points is used only for the MMLM mode, as it is the most complex prediction method.

In one embodiment, the LM derivation with two points is used for the CCLM mode and the MMLM mode to derive a chroma block predictor. This embodiment has similar coding efficiency as the JEM but it reduces the worst-case complexity by using this simplified LM derivation for the generation of the chroma block predictors. Indeed the chroma prediction based on luma is the mode presenting the worst-case complexity among the prediction linear model modes. It is more complex than the residual chroma prediction.

In one embodiment, the LM derivation with two points replaces all LMS derivations (chroma block predictor generation and residual prediction). This embodiment reduces the coding efficiency compared to JEM but it significantly decreases the complexity. Please note that these two embodiments give a coding efficiency improvement whatever the derivation method used in step 1203 for parameters.

In yet another embodiment, if one or both of the slope parameters α (or L) are "abnormal", then a default value (such as −(1<<S)/8) is used instead in steps 1206 and/or 1207, and the corresponding value β is computed.

In yet a further embodiment, several LM modes are competing at encoder side, and syntax elements may signal the selected LM mode in the bitstream at decoder side. This signaling may be at the slice-level (or PPS, or SPS) to indicate which sets should be used, or at least provide the candidates for a block-level selection. At least one of the differences between these competing LM modes is the set of two points used to derive the LM parameters. The set of two points and the method to generate these two points define different LM modes in competition. For example, for one LM mode the two points are determined based on the minimum and the maximum luma values and for one another LM mode the two points are selected based on the maximum and minimum chroma values.

Another embodiment consists in defining a number of sets from possible locations as illustrated on FIG. 5. While four such different points can lead to up to twelve different pairs, the ones resulting in the largest values for the numerator and denominator in the equation for the calculation of the slope parameter a (or L) can be preferred. The encoder builds the list of pairs, and sort them according to some criterion (such as distance in the luma component, or Cartesian distance using both luma and chroma components), possibly removing some of them (i.e. if their slope is too close to another one), and thus building the list of parameters that can be selected and signaled.

The advantage of these embodiments is a coding efficiency improvement.

The descriptions of these embodiments mention the luma and a chroma component but can easily be adapted to other components such as both chroma components, or RGB components. According to an embodiment, the present invention is used when predicting a first chroma component sample value from a second chroma component. In another embodiment, the present invention is used when predicting a sample value of one component from more than one sample values of more than one component. It is understood that in such a case, the linear model is derived based on two points/sets, each point/set comprising a sample value of the one component, and the more than one sample values of the more than one component. For example, if two components' sample values are used to predict the one component's sample value, each point/set can be represented as a position in a 3-dimensional space, and the linear model is based on a straight line passing through the two positions in the 3-dimensional space that correspond to the two points/sets of the reconstructed sample values.

Figure 13:
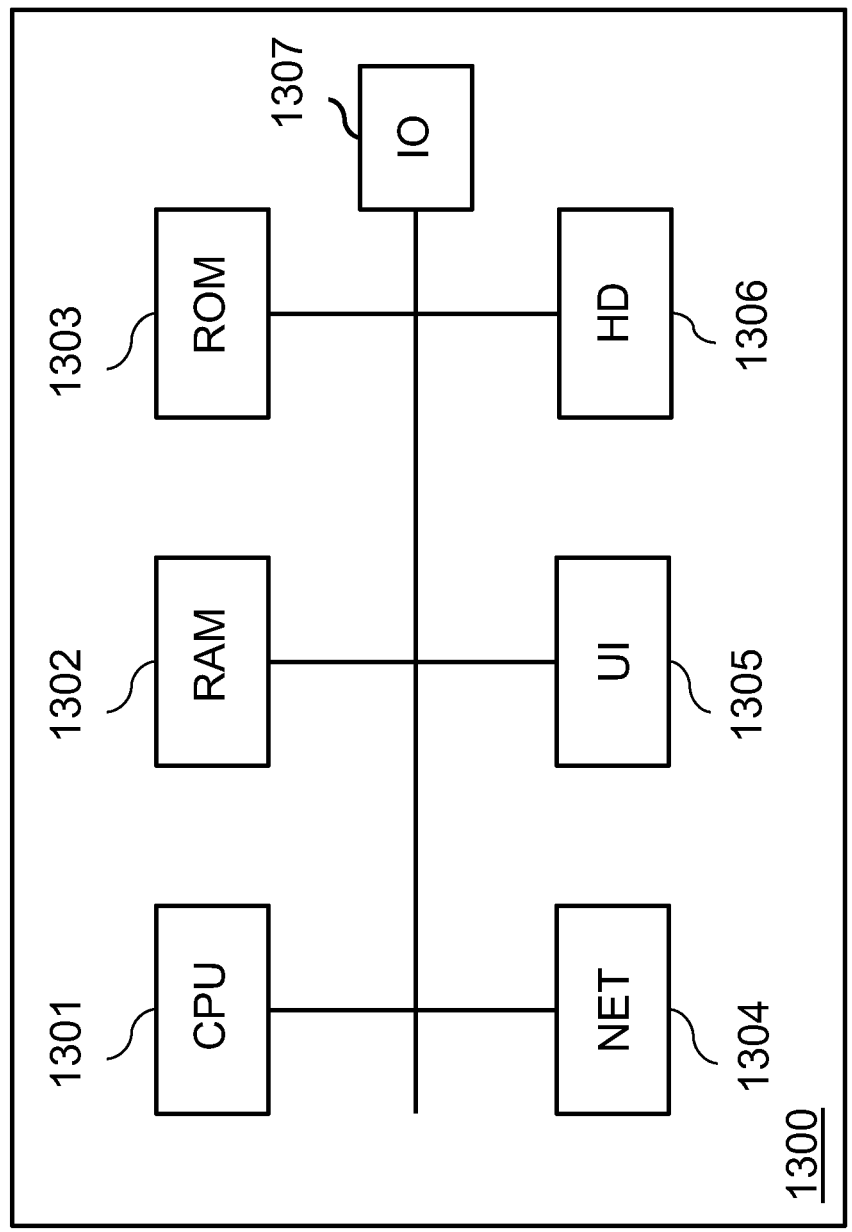
FIG. 13 is a schematic block diagram of a computing device for implementation of one or more embodiments of the invention.

FIG. 13 is a schematic block diagram of a computing device 1300 for implementation of one or more embodiments of the invention. The computing device 1300 may be a device such as a micro-computer, a workstation or a light portable device. The computing device 1300 comprises a communication bus connected to:
- a central processing unit 1301, such as a microprocessor, denoted CPU;
- a random access memory 1302, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 1303, denoted ROM, for storing computer programs for implementing embodiments of the invention;
- a network interface 1304 is typically connected to a communication network over which digital data to be processed are transmitted or received. The network interface 1304 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1301;
- a user interface 1305 may be used for receiving inputs from a user or to display information to a user;
- a hard disk 1306 denoted HD may be provided as a mass storage device;
- an I/O module 1307 may be used for receiving/sending data from/to external devices such as a video source or display.

The executable code may be stored either in read only memory 1303, on the hard disk 1306 or on a removable digital medium such as for example a disk. According to a variant, the executable code of the programs can be received by means of a communication network, via the network interface 1304, in order to be stored in one of the storage means of the communication device 1300, such as the hard disk 1306, before being executed.

The central processing unit 1301 is adapted to control and direct the execution of the instructions or portions of software code of the program or programs according to embodiments of the invention, which instructions are stored in one of the aforementioned storage means. After powering on, the CPU 1301 is capable of executing instructions from main RAM memory 1302 relating to a software application after those instructions have been loaded from the program ROM 1303 or the hard-disc (HD) 1306 for example. Such a software application, when executed by the CPU 1301, causes the steps of the method according to the invention to be performed.

Any step of the methods according to the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") especially for the Minima and Maxima selection, or an ASIC ("Application-Specific Integrated Circuit").

It is also to be noted that while some examples are based on HEVC for the sake of illustration, the invention is not limited to HEVC. For example, the present invention can also be used in any other prediction/estimation process where a relationship between two or more components' sample values can be estimated/predicted with a model, wherein the model is an approximate model determined based on at least two sets of related/associated component sample values selected from all available sets of the related/associated component sample values.

It is understood that each point corresponding to a sample pair (i.e. a set of associated sample values for different components) may be stored and/or processed in terms of an array. For example, each component's sample values may be stored in an array so that each sample value of that component is referable/accessible/obtainable by referencing an element of that array, using an index for that sample value for example. Alternatively, an array may be used to store and process each sample pairs that each sample value of the sample pairs accessible/obtainable as an element of the array.

It is also understood that any result of comparison, determination, assessment, selection, or consideration described above, for example a selection made during an encoding process, may be indicated in or determinable from data in a bitstream, for example a flag or data indicative of the result, so that the indicated or determined result can be used in the processing instead of actually performing the comparison, determination, assessment, selection, or consideration, for example during a decoding process.

Although the present invention has been described hereinabove with reference to specific embodiments, the present invention is not limited to the specific embodiments, and modifications will be apparent to a skilled person in the art, which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The following numbered clauses also define certain embodiments:

1. A method of deriving a linear model for obtaining a first-component sample for a first-component block from an associated reconstructed second-component sample of a second-component block in the same frame, the method comprising:
    determining two points, each point being defined by two variables, the first variable corresponding to a second-component sample value, the second variable corresponding to a first-component sample value, based on reconstructed samples of both the first-component and the second-component; determining the parameters of a linear equation representing a straight line passing by the two points; and
    deriving the linear model defined by the straight line parameters.
2. The method of clause 1, wherein the two points are determined based on sample pairs in the neighbourhood of the second-component block.
3. The method of clause 2, wherein the two points are determined based on the sample values of the sample pairs in the neighbourhood of the second-component block.
4. The method of clause 3, wherein the two points correspond respectively to the sample pairs with the lowest second-component sample value and with the highest second-component sample value.
5. The method of clause 3, wherein the two points correspond respectively to the sample pairs with the lowest first-component sample value and with the highest first-component sample value.
6. The method of clause 3, wherein the method comprises:
    determining two first points corresponding respectively to the sample pairs with the lowest second-component sample value and with the highest second-component sample value;
    determining two second points corresponding respectively to the sample pairs with the lowest first-component sample value and with the highest first-component sample value; and
    determining the two points as the two first points if they form a longer segment, and determining the two points as the two second points otherwise.
7. The method of clause 3, wherein the method comprises:
    determining two first points corresponding respectively to the sample pairs with the lowest second-component sample value and with the highest second-component sample value;
    determining two second points corresponding respectively to the sample pairs with the lowest first-component sample value and with the highest first-component sample value; and
    determining the two points among the two first points and the two second points as the two points forming the longest segment.
8. The method of clause 3, wherein the method comprises:
    determining two first points corresponding respectively to the sample pairs with the lowest second-component sample value and with the highest second-component sample value;
    determining two second points corresponding respectively to the sample pairs with the lowest first-component sample value and with the highest first-component sample value; and
    determining the two points as the two first points if all their variables are different, and determining the two points as the two second points otherwise.
9. The method of clause 3, wherein the method comprises:
    determining two first points corresponding respectively to the sample pairs with the lowest second-component sample value and with the highest second-component sample value;
    determining two second points corresponding respectively to the sample pairs with the lowest first-component sample value and with the highest first-component sample value; and
    determining the two points as the two first points if the slope parameter of the straight line defined by these two points is greater than a given threshold, and determining the two points as the two second points otherwise.
10. The method of clause 3, wherein the method comprises:
    determining two first points corresponding respectively to the sample pairs with the lowest second-component sample value and with the highest second-component sample value;
    determining two second points corresponding respectively to the sample pairs with the lowest first-component sample value and with the highest first-component sample value; and
    determining the two points as the two first points if the difference between the lowest second-component sample value and the highest second-component sample value is greater than the difference between the lowest first-component sample value and the highest first-component sample value, and determining the two points as the two second points otherwise.
11. The method of clause 2, wherein the two points are determined based on the position of the second-component sample value of the sample pairs in the neighbourhood of the second-component block.

12. The method of clause 11, wherein the two points are determined as corresponding to the sample pairs at a predetermined position in the neighbourhood of the second-component block.
13. The method of clause 12, further comprising determining at least one of the two points as corresponding to the sample pair at a second predetermined position when the sample pair at a predetermined position is not available.
14. The method of clause 1, wherein the two points are determined based on sample pairs in the neighbourhood of the second-component block and the second-component block sample values.
15. The method of clause 14, wherein:
the first variables of the two points are determined as the sample value, among the sample pairs in the neighbourhood of the second-component block, with the maximum occurrence in the second-component block and the second maximum occurrence in the second-component block;
the second variables of the two points are determined as the corresponding first-component sample value based on the sample pairs in the neighbourhood of the second-component block.
16. The method of any one clause 1 to 15, wherein:
the samples of the second-component block are organized into at least two groups; and
two points are determined for the definition of a linear model for each group of samples of the second-component block.
17. The method of clause 16, wherein if the two points determined for a group correspond to a slope parameter lower than a predetermined threshold, then they are replaced by two points determined for another group.
18. The method of clause 16, wherein if the two points determined for a group correspond to a slope parameter lower than a predetermined threshold, then two new points are determined based on the samples of all the groups considered as a single group.
19. A method of obtaining a first-component sample for a first-component block from an associated reconstructed second-component sample of a second-component block in the same frame, the method comprising:
defining a plurality of linear model derivation modes comprising CCLM modes using a single linear model and MMLM modes using several linear models; and
selecting one of the linear model derivation modes for obtaining the first-component samples for a first-component block,
wherein:
at least one of the linear model derivation modes uses a method of derivation according to any one clause from 1 to 18.
20. The method of clause 19, wherein only the CCLM modes use a method of derivation according to any one clause from 1 to 18.
21. The method of clause 19, wherein only the MMLM modes use a method of derivation according to any one clause from 1 to 18.
22. A method of encoding one or more images into a bitstream, wherein the method comprises deriving a linear model according to any one of clauses 1 to 18.
23. A method of encoding one or more images into a bitstream, wherein the method comprises obtaining a first-component sample for a first-component block of the one or more images from an associated reconstructed second-component sample block according to any one of clauses 19 to 21.
24. A method of decoding one or more images from a bitstream, wherein the method comprises deriving a linear model according to any one of clauses 1 to 18.
25. A method of decoding one or more images from a bitstream, wherein the method comprises obtaining a first-component sample for a first-component block of the one or more images from an associated reconstructed second-component sample block according to any one of clauses 19 to 21.
26. A device for deriving a linear model for obtaining a first-component sample for a first-component block from an associated reconstructed second-component sample of a second-component block in the same frame, the device comprising a means for:
determining two points, each point being defined by two variables, the first variable corresponding to a second-component sample value, the second variable corresponding to a first-component sample value, based on reconstructed samples of both the first-component and the second-component;
determining the parameters of a linear equation representing a straight line passing by the two points; and
deriving the linear model defined by the straight line parameters.
27. The device of clause 26, wherein the two points are determined based on sample pairs in the neighbourhood of the second-component block.
28. The device of clause 27, wherein the two points are determined based on the sample values of the sample pairs in the neighbourhood of the second-component block.
29. The device of clause 26, wherein the two points correspond respectively to the sample pairs with the lowest second-component sample value and with the highest second-component sample value.
30. The device of clause 26, wherein the two points correspond respectively to the sample pairs with the lowest first-component sample value and with the highest first-component sample value.
31. The device of clause 26, wherein the means is configured to perform:
determining two first points corresponding respectively to the sample pairs with the lowest second-component sample value and with the highest second-component sample value;
determining two second points corresponding respectively to the sample pairs with the lowest first-component sample value and with the highest first-component sample value; and
determining the two points as the two first points if they form a longer segment, and determining the two points as the two second points otherwise.
32. The device of clause 26, wherein the means is configured to perform:
determining two first points corresponding respectively to the sample pairs with the lowest second-component sample value and with the highest second-component sample value;
determining two second points corresponding respectively to the sample pairs with the lowest first-component sample value and with the highest first-component sample value; and
determining the two points among the two first points and the two second points as the two points forming the longest segment.

33. The device of clause 26, wherein the means is configured to perform:
  determining two first points corresponding respectively to the sample pairs with the lowest second-component sample value and with the highest second-component sample value;
  determining two second points corresponding respectively to the sample pairs with the lowest first-component sample value and with the highest first-component sample value; and
  determining the two points as the two first points if all their variables are different, and determining the two points as the two second points otherwise.
34. The device of clause 26, wherein the means is configured to perform:
  determining two first points corresponding respectively to the sample pairs with the lowest second-component sample value and with the highest second-component sample value;
  determining two second points corresponding respectively to the sample pairs with the lowest first-component sample value and with the highest first-component sample value; and
  determining the two points as the two first points if the slope parameter of the straight line defined by these two points is greater than a given threshold, and determining the two points as the two second points otherwise.
35. The device of clause 26, wherein the means is configured to perform:
  determining two first points corresponding respectively to the sample pairs with the lowest second-component sample value and with the highest second-component sample value;
  determining two second points corresponding respectively to the sample pairs with the lowest first-component sample value and with the highest first-component sample value; and
  determining the two points as the two first points if the difference between the lowest second-component sample value and the highest second-component sample value is greater than the difference between the lowest first-component sample value and the highest first-component sample value, and determining the two points as the two second points otherwise.
36. The device of clause 27, wherein the two points are determined based on the position of the sample pairs in the neighbourhood of the second-component block.
37. The device of clause 36, wherein the two points are determined as corresponding to the sample pairs at a predetermined position in the neighbourhood of the second-component block.
38. The device of clause 37, further comprising determining at least one of the two points as corresponding to the sample pair at a second predetermined position when the sample pair at a predetermined position is not available.
39. The device of clause 26, wherein the two points are determined based on sample pairs in the neighbourhood of the second-component block and the second-component block sample values.
40. The device of clause 39, wherein:
  the first variables of the two points are determined as the sample value with the maximum occurrence in the second-component block and the second maximum occurrence in the second-component block;
  the second variables of the two points are determined as the corresponding first-component sample value based on the sample pairs in the neighbourhood of the second-component block.
41. The device of any one clause 26 to 40, wherein:
  the samples of the second-component block are organized into at least two groups; and
  two points are determined for the definition of a linear model for each group of samples of the second-component block.
42. The device of clause 41, wherein if the two points determined for a group correspond to a slope parameter lower than a predetermined threshold, then they are replaced by two points determined for another group.
43. The device of clause 41, wherein if the two points determined for a group correspond to a slope parameter lower than a predetermined threshold, then two new points are determined based on the samples of all the groups considered as a single group.
44. A device for obtaining a first-component sample for a first-component block from an associated reconstructed second-component sample of a second-component block in the same frame, the device comprising a means for:
  defining a plurality of linear model derivation modes comprising CCLM modes using a single linear model and MMLM modes using several linear models;
  selecting one of the linear model derivation modes for obtaining the first-component samples for a first-component block;
  wherein:
  at least some of the linear model derivation modes using a method of derivation according to any one clause from 1 to 18.
45. The device of clause 44, wherein only the CCLM modes use a method of derivation according to any one clause from 1 to 18.
46. The device of clause 44, wherein only the MMLM modes use a method of derivation according to any one clause from 1 to 18.
47. A device for encoding images, wherein the device comprises a means for deriving a linear model according to any one clause 1 to 18.
48. A device for decoding images, wherein the device comprises a means for deriving a linear model according to any one clause 1 to 18.
49. A computer program product for a programmable apparatus, the computer program product comprising a sequence of instructions for implementing a method according to any one of clauses 1 to 25, when loaded into and executed by the programmable apparatus.
50. A computer-readable medium storing a program which, when executed by a microprocessor or computer system in a device, causes the device to perform a method according to any one of clauses 1 to 25.
51. A computer program which upon execution causes the method of any one of clauses 1 to 25 to be performed.

The invention claimed is:
1. A method for encoding one or more images by deriving parameters of a linear model for obtaining a chroma sample of a target area from an associated luma sample of the target area, the method comprising:
  determining two pairs of values for determining the parameters of the linear model, each of the two pairs being defined by two variables, a first variable of the two variables corresponding to a luma sample, a second variable of the two variables corresponding to a chroma sample;

determining the parameters of the linear model including a parameter corresponding to a slope of the linear model by using the two pairs of values;

wherein a magnitude of the parameter corresponding to the slope is restricted so that a number of bits to represent the slope in integer arithmetic does not exceed 5 bits; and determining a parameter corresponding to an intercept of the linear model by using one of said two pairs and said determined parameter corresponding to the slope of the linear model.

2. The method according to claim 1, wherein the determining the parameter corresponding to the slope of the linear model comprises determining a division, said determining comprising reducing a magnitude of the division by applying a bit-shift to said division.

3. A method for decoding one or more images by deriving parameters of a linear model for obtaining a chroma sample of a target area from an associated luma sample of the target area, the method comprising:

determining two pairs of values for determining the parameters of the linear model, each of the two pairs being defined by two variables, a first variable of the two variables corresponding to a luma sample, a second variable of the two variables corresponding to a chroma sample;

determining the parameters of the linear model including a parameter corresponding to a slope of the linear model by using the two pairs of values; and wherein a magnitude of the parameter corresponding to the slope is restricted so that a number of bits to represent the slope in integer arithmetic does not exceed 5 bits; and determining a parameter corresponding to an intercept of the linear model by using one of said two pairs and said determined parameter corresponding to the slope of the linear model.

4. The method according to claim 3, wherein the determining the parameter corresponding to the slope of the linear model comprises determining a division, said determining comprising reducing a magnitude of the division by applying a bit-shift to said division.

5. A device for encoding one or more images by deriving parameters of a linear model for obtaining a chroma sample of a target area from an associated luma sample of the target area, wherein the device comprises:

a deriving unit for deriving parameters of the linear model;

a first determining unit for determining two pairs of values for determining the parameters of the linear model, each of the two pairs being defined by two variables, a first variable of the two variables corresponding to a luma sample, a second variable of the two variables corresponding to a chroma sample;

a second determining unit for determining the parameters of the linear model including a parameter corresponding to a slope of the linear model by using the two pairs of values; and wherein a magnitude of the parameter corresponding to the slope is restricted so that a number of bits to represent the slope in integer arithmetic does not exceed 5 bits, and the second determining unit is configured to determine a parameter corresponding to an intercept of the linear model by using one of said two pairs and said determined parameter corresponding to the slope of the linear model.

6. A device for decoding one or more images by deriving parameters of a linear model for obtaining a chroma sample of a target area from an associated luma sample of the target area, wherein the device comprises:

a deriving unit for deriving parameters of the linear model;

a first determining unit for determining two pairs of values for determining the parameters of the linear model, each of the two pairs being defined by two variables, a first variable of the two variables corresponding to a luma sample, a second variable of the two variables corresponding to a chroma sample;

a second determining unit for determining the parameters of the linear model including a parameter corresponding to a slope of the linear model by using the two pairs of values; and wherein a magnitude of the parameter corresponding to the slope is restricted so that a number of bits to represent the slope in integer arithmetic does not exceed 5 bits, and the second determining unit is configured to determine a parameter corresponding to an intercept of the linear model by using one of said two pairs and said determined parameter corresponding to the slope of the linear model.

7. A non-transitory computer readable medium comprising executable code for a programmable apparatus, the executable code comprising a sequence of instructions for implementing a method for encoding one or more images by deriving parameters of a linear model for obtaining a chroma sample of a target area from an associated luma sample of the target area, the method comprising:

determining two pairs of values for determining the parameters of the linear model, each of the two pairs being defined by two variables, a first variable of the two variables corresponding to a luma sample, a second variable of the two variables corresponding to a chroma sample;

determining the parameters of the linear model including a parameter corresponding to a slope of the linear model by using the two pairs of values; and wherein a magnitude of the parameter corresponding to the slope is restricted so that a number of bits to represent the slope in integer arithmetic does not exceed 5 bits, and determining a parameter corresponding to an intercept of the linear model by using one of said two pairs and said determined parameter corresponding to the slope of the linear model.

8. A non-transitory computer readable medium comprising executable code for a programmable apparatus, the executable code comprising a sequence of instructions for implementing a method for decoding one or more images by deriving parameters of a linear model for obtaining a chroma sample of a target area from an associated luma sample of the target area, the method comprising:

determining two pairs of values for determining the parameters of the linear model, each of the two pairs being defined by two variables, a first variable of the two variables corresponding to a luma sample, a second variable of the two variables corresponding to a chroma sample;

determining the parameters of the linear model including a parameter corresponding to a slope of the linear model by using the two pairs of values; and wherein a magnitude of the parameter corresponding to the slope is restricted so that a number of bits to represent the slope in integer arithmetic does not exceed 5 bits, and determining a parameter corresponding to an intercept of the linear model by using one of said two pairs and said determined parameter corresponding to the slope of the linear model.

* * * * *